United States Patent
Cao et al.

(10) Patent No.: US 12,462,487 B2
(45) Date of Patent: Nov. 4, 2025

(54) DATA PROCESSING METHOD, APPARATUS, DEVICE, AND MEDIUM

(71) Applicant: Tencent Technology (Shenzhen) Company Limited, Shenzhen (CN)

(72) Inventors: Zhe Cao, Shenzhen (CN); Shuhuai Huang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 98 days.

(21) Appl. No.: 18/386,284

(22) Filed: Nov. 2, 2023

(65) Prior Publication Data
US 2024/0062469 A1    Feb. 22, 2024

Related U.S. Application Data

(63) Continuation of application No. PCT/CN2023/073928, filed on Jan. 31, 2023.

(30) Foreign Application Priority Data

Mar. 11, 2022 (CN) .......................... 202210234766.0

(51) Int. Cl.
*G06T 17/20* (2006.01)
*G06T 7/13* (2017.01)
(Continued)

(52) U.S. Cl.
CPC ............... *G06T 17/20* (2013.01); *G06T 7/13* (2017.01); *G06V 10/44* (2022.01); *G06V 10/54* (2022.01)

(58) Field of Classification Search
CPC ........... G06T 17/20; G06T 7/13; G06T 15/04; G06T 2219/021; G06T 2219/2008;
(Continued)

(56) References Cited

U.S. PATENT DOCUMENTS

2009/0128556 A1* 5/2009 Fischer ................... G06T 17/20
345/420
2016/0371891 A1    12/2016 Kim et al.
(Continued)

FOREIGN PATENT DOCUMENTS

CN    106651895 A    5/2017
CN    109727307 A    5/2019
(Continued)

OTHER PUBLICATIONS

Mar. 11, 2022—(CN) Search Report—App 2022102347660.
(Continued)

*Primary Examiner* — Sultana M Zalalee
(74) *Attorney, Agent, or Firm* — Banner & Witcoff, Ltd.

(57) ABSTRACT

A data processing method, apparatus, device, and medium are provided. The method may include obtaining a set of edges marked as usable for cutting from a two-dimensional mesh model, searching the set of edges to obtain a cut path set, calculating, for each candidate cut path in the cut path set, a path length, and calculating a structural evaluation value corresponding to the candidate cut path. The method may further include calculating a cut evaluation estimate of each candidate cut path based on the path length and the structural evaluation value, selecting one candidate cut path as a target cut path according to the cut evaluation value, and cutting the two-dimensional mesh model into at least two sub-models using the target cut path, where the at least two sub-models may be used for generating a texture unwrapping result of the two-dimensional mesh mode.

20 Claims, 8 Drawing Sheets

(51) Int. Cl.
  *G06V 10/44* (2022.01)
  *G06V 10/54* (2022.01)
(58) Field of Classification Search
  CPC ......... G06T 19/20; G06T 3/067; G06V 10/44; G06V 10/54; G06V 20/64
  See application file for complete search history.

(56) References Cited

U.S. PATENT DOCUMENTS

| | | |
|---|---|---|
| 2017/0004659 A1 | 1/2017 | Boichentsov et al. |
| 2017/0124753 A1 | 5/2017 | Arisman |
| 2017/0132791 A1* | 5/2017 | Li .......................... G06T 19/20 |
| 2021/0142561 A1 | 5/2021 | Aigerman |
| 2021/0166398 A1* | 6/2021 | Montana .................. G06T 7/11 |

FOREIGN PATENT DOCUMENTS

| | | |
|---|---|---|
| CN | 112561788 A | 3/2021 |
| CN | 114418836 A | 4/2022 |

OTHER PUBLICATIONS

Apr. 6, 2023—(WO) Search Report—App PCT/CN2023/073928.
Cuadros-Vargas et al., "Improving 2D Mesh Image Segmentation with Markovian Random Fields", Dec. 11, 2006, 2006 19th Brazillian Symposium on Computer Graphics and Image Processing, 8 pages.
Dinglin et al., "Automatic surface filling method for cutting profiles based on triangular mesh model", Mar. 2019.

\* cited by examiner

DATA PROCESSING METHOD, APPARATUS, DEVICE, AND MEDIUM

RELATED APPLICATION

This application claims priority to Chinese Patent Application No. 202210234766.0, filed with the China National Intellectual Property Administration on Mar. 11, 2022, and entitled "DATA PROCESSING METHOD, APPARATUS, DEVICE, AND MEDIUM", which is incorporated herein by reference in its entirety, and a continuation of PCT Application No. PCT/CN2023/073928 filed Jan. 31, 2023, which is also incorporated herein by reference in its entirety.

FIELD OF THE TECHNOLOGY

Aspects described herein relate to the field of image rendering technologies, and in particular, to a data processing method, apparatus, device, and medium.

BACKGROUND

A virtual three-dimensional model is a mathematical representation of a three-dimensional object in a virtual space, including a mathematical representation of a shape and a mathematical representation of a surface texture. Typically, the shape of the virtual three-dimensional model is approximated by using a three-dimensional mesh model. The three-dimensional mesh model represents the surface of the virtual three-dimensional model by combining multiple polygon units (e.g., triangles, quadrilaterals, etc.) in space. When editing the surface texture of the virtual three-dimensional model (that is, rendering of a three-dimensional mesh), the three-dimensional mesh may be cut into one or more blocks, and each block is unwrapped to a two-dimensional plane (such as a texture space) and mapped into a two-dimensional mesh. This process is known as UV unwrapping, and an unwrapped two-dimensional mesh is generally referred to as a UV island. The processing effect and processing efficiency of the surface texture of the virtual three-dimensional model are closely related to the regularity of the UV island.

SUMMARY

Aspects described herein provide a data processing method, apparatus, device, and medium, which can improve regularity of a two-dimensional mesh, and further improve a texture unwrapping effect of a two-dimensional mesh model.

Aspects described herein provide a data processing method, including:
  obtaining a set of edges, marked as usable for cutting, from a two-dimensional mesh model, the two-dimensional mesh model being a connected two-dimensional mesh in at least one two-dimensional mesh obtained by performing two-dimensional unwrapping of a virtual three-dimensional model;
  searching the set of edges to obtain a cut path set, the cut path set including at least two candidate cut paths, each candidate cut path including at least one edge of the set of edges, and the at least one edge cutting the two-dimensional mesh model into at least two separated two-dimensional mesh models;
  calculating, for each of the at least two candidate cut paths in the cut path set, a path length of the candidate cut path, and calculating, according to a preset algorithm, a structural evaluation value corresponding to the candidate cut path, the structural evaluation value representing regularity degrees of shapes of at least two sub-models obtained by cutting the two-dimensional mesh model by using the candidate cut path;
  calculating a cut evaluation estimate of each candidate cut path based on the path length and the structural evaluation value;
  selecting one candidate cut path from the at least two candidate cut paths as a target cut path according to the cut evaluation value; and
  cutting the two-dimensional mesh model into at least two sub-models by using the target cut path, the at least two sub-models being used for generating a texture unwrapping result of the two-dimensional mesh model.

Aspects described herein also provide a data processing apparatus, including:
  a path obtaining module, configured to obtain a set of edges, marked as usable for cutting, from a two-dimensional mesh model, the two-dimensional mesh model being a connected two-dimensional mesh in at least one two-dimensional mesh obtained by performing two-dimensional unwrapping of a virtual three-dimensional model; and to search the set of edges to obtain a cut path set, the cut path set including at least two candidate cut paths, each candidate cut path including at least one edge of the set of edges, and the at least one edge cutting the two-dimensional mesh model into at least two separated two-dimensional mesh models;
  a path selection module, configured to: calculate, for each of the at least two candidate cut paths in the cut path set, a path length of the candidate cut path, and calculate, according to a preset algorithm, a structural evaluation value corresponding to the candidate cut path, the structural evaluation value representing regularity degrees of shapes of at least two sub-models obtained by cutting the two-dimensional mesh model by using the candidate cut path; calculate a cut evaluation estimate of each candidate cut path based on the path length and the structural evaluation value; and select one candidate cut path from the at least two candidate cut paths as a target cut path according to the cut evaluation value; and
  a model cutting module, configured to cut the two-dimensional mesh model into at least two sub-models by using the target cut path; the at least two sub-models being used for generating a texture unwrapping result of the two-dimensional mesh model.

Aspects further provide a computer device, including a memory and a processor, where the memory is connected to the processor, the memory is configured to store a computer program, and the processor is configured to invoke the computer program, so that the computer device performs the methods described herein.

Still further, aspects described herein provide a computer readable storage medium. The computer readable storage medium stores a computer program. The computer program is suitable for being loaded and executed by a processor, so that a computer device having the processor performs the methods described herein.

Aspects described herein can improve regularity of a model cutting result, thereby improving a texture unwrapping effect of a two-dimensional mesh model, and improving a processing effect and processing efficiency of a surface texture of a virtual three-dimensional model.

BRIEF DESCRIPTION OF THE DRAWINGS

The following briefly introduces the accompanying drawings for used in explaining aspects described herein. The accompanying drawings in the following description show only some embodiments, and a person of ordinary skill in the art would recognize that variations of the drawings may be made.

DETAILED DESCRIPTION

Figure 1:
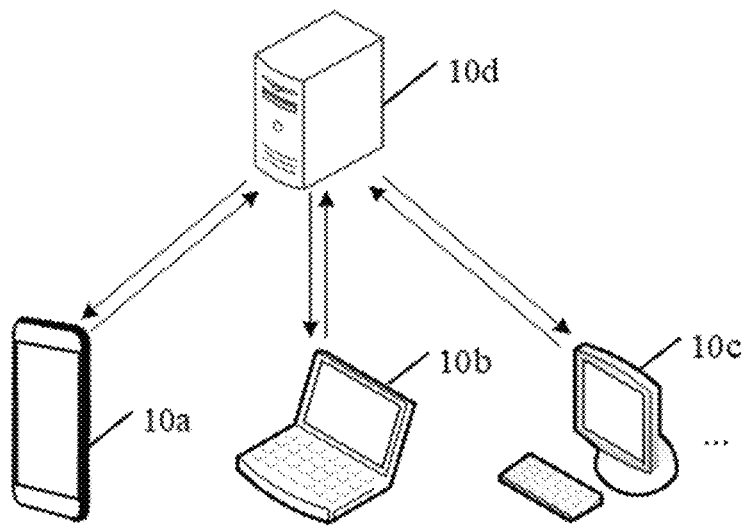
FIG. 1 is a schematic structural diagram of a network architecture according to one or more aspects described herein.

The technical solutions of this application are described in the following with reference to the accompanying drawings. The described aspects are merely some examples rather than all possible variations. As a person of ordinary skill in the art would appreciate that variations based on the examples described herein may be made without creative efforts, and that such variations fall within the scope of this application.

For ease of description in the following, related technologies are first briefly described below.

Three-dimensional mesh (3D Mesh): A three-dimensional mesh is generally a form of discrete representation of a three-dimensional model by combining polygons, and three-dimensional mesh data may include vertices, edges, and planes.

UV unwrapping: UV unwrapping may be a process of cutting a three-dimensional mesh and unwrapping a three-dimensional mesh block obtained into a two-dimensional plane, where the two-dimensional plane space may be referred to as a UV space, or may be referred to as a texture space. A two-dimensional space in which values of u and v are between 0-1 may be referred to as a unit UV space.

UV island: A three-dimensional mesh may be divided into multiple mesh blocks, and each mesh block may be unwrapped to a UV space. In the UV space, one mesh block may be unwrapped into one two-dimensional mesh model. Different two-dimensional mesh models are generally independent of each other, and each independent two-dimensional mesh model may be referred to as a UV island.

UV texture: In a rendering scenario, a picture drawn in a UV space may be referred to as a texture. Based on an inverse process of UV unwrapping, a drawn texture may be mapped to a three-dimensional mesh surface, so as to represent an effect such as a model color, a material, and a light shadow.

1UV and 2UV: Two sets of UVs (including 1UV and 2UV) may be used in an art resource (such as a game art resource) of a rendering scenario, where 1UV may be used for drawing a color texture, a normal texture, and the like, and 2UV may be used for drawing a light texture, a shadow texture, and the like.

Soft edge and hard edge: Soft edge and the hard edge may be used for defining and classifying edges of a three-dimensional model mesh in a process of making a three-dimensional model. In a rendering scenario, light shadow changes on both sides of a hard edge are severe, and a clear contrast may be formed. The light shadows on both sides of a soft edge transition more gently, and lightness and darkness are blurred. For example, a light shadow change threshold may be preset or defined according to an actual requirement or experience. An edge whose light shadow change amount is greater than the light shadow change threshold may be referred to as a hard edge, and an edge whose light shadow change amount is less than or equal to the light shadow change threshold may be referred to as a soft edge.

UV packing (may also be referred to as UV nesting): UV packing may be a process in which UV islands are arranged in unit UV spaces at fixed intervals, where a unit UV space usually is desirable to be filled as full as possible.

Convex hull: The convex hull may be a smallest convex polygon, and all points in a point set are in or on an edge of the polygon.

Euler characteristic: The Euler characteristic may refer to a topology invariant. An expression thereof may be denoted as $\chi=V-E+F$, where V denotes a quantity of vertices of a topology, E denotes a quantity of edges of the topology, and F denotes a quantity of planes of the topology. When the topology changes, if there is a hole in the topology, the Euler characteristic $\chi$ may change.

FIG. 1 is a schematic structural diagram of a network architecture according to aspects described herein. As shown in FIG. 1, the network architecture may include a server 10*d* and a user terminal cluster. The user terminal cluster may include one or more user terminals, and a quantity of user terminals is not limited in this application. The user terminal cluster shown in FIG. 1 may include a user terminal 10*a*, a user terminal 10*b*, a user terminal 10*c*, and the like. The user terminal in the user terminal cluster may include, but is not limited to, an electronic device that has a UV cutting and unwrapping optimization function, such as a smartphone, a tablet computer, a laptop computer, a palmtop computer, a mobile internet device (MID), a wearable device (such as a smart watch or a smart band), a smart home device (such as a smart TV), and an in-vehicle device. The server 10*d* may be an independent physical server, or may be a server cluster or a distributed system formed by multiple physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. As shown in FIG. 1, each of the user terminals in the user terminal cluster, including the user terminal 10a, the user terminal 10b, and the user terminal 10c, may be connected to the server 10d by using a network, so that the user terminals can exchange data with the server 10d by using the network connection.

A user terminal (for example, the user terminal 10a) shown in FIG. 1 may run a UV cutting and unwrapping tool, and the UV cutting and unwrapping tool may be used for cutting a UV island (which may also be referred to as a two-dimensional mesh model) to obtain a cutting result of the UV island. Therefore, UV unwrapping may be performed on the cutting result again, and a re-unwrapped two-dimensional mesh is concatenated to obtain a new UV island. If an unwrapping effect corresponding to the new UV island does not meet a preset requirement, the new UV island may continue to be cut based on a rollback mechanism in the UV cutting and unwrapping tool, such as rolling back to the UV cutting operation, until the UV unwrapping effect meets the preset requirement to implement regularization processing on the irregular UV island. In this manner, a shape of a finally obtained UV island may be normalized, thereby improving a surface texture processing effect and processing efficiency of the three-dimensional model. The irregular UV island may be a UV island that has a feature such as a narrow long structure, an irregular outer contour, and a relatively large quantity of internal holes. The cutting result of the irregular UV island in the UV cutting and unwrapping tool may be displayed in the user terminal 10a. In some arrangements, the UV island cutting process and the mesh splicing process in the UV cutting and unwrapping tool may also be completed in the server 10d. In such a case, the server 10d may be a background server corresponding to the UV cutting and unwrapping tool. The device or system executing a cutting of the UV island is not limited to a server or user terminal, and may include various other devices, apparatuses or systems.

Figure 2:
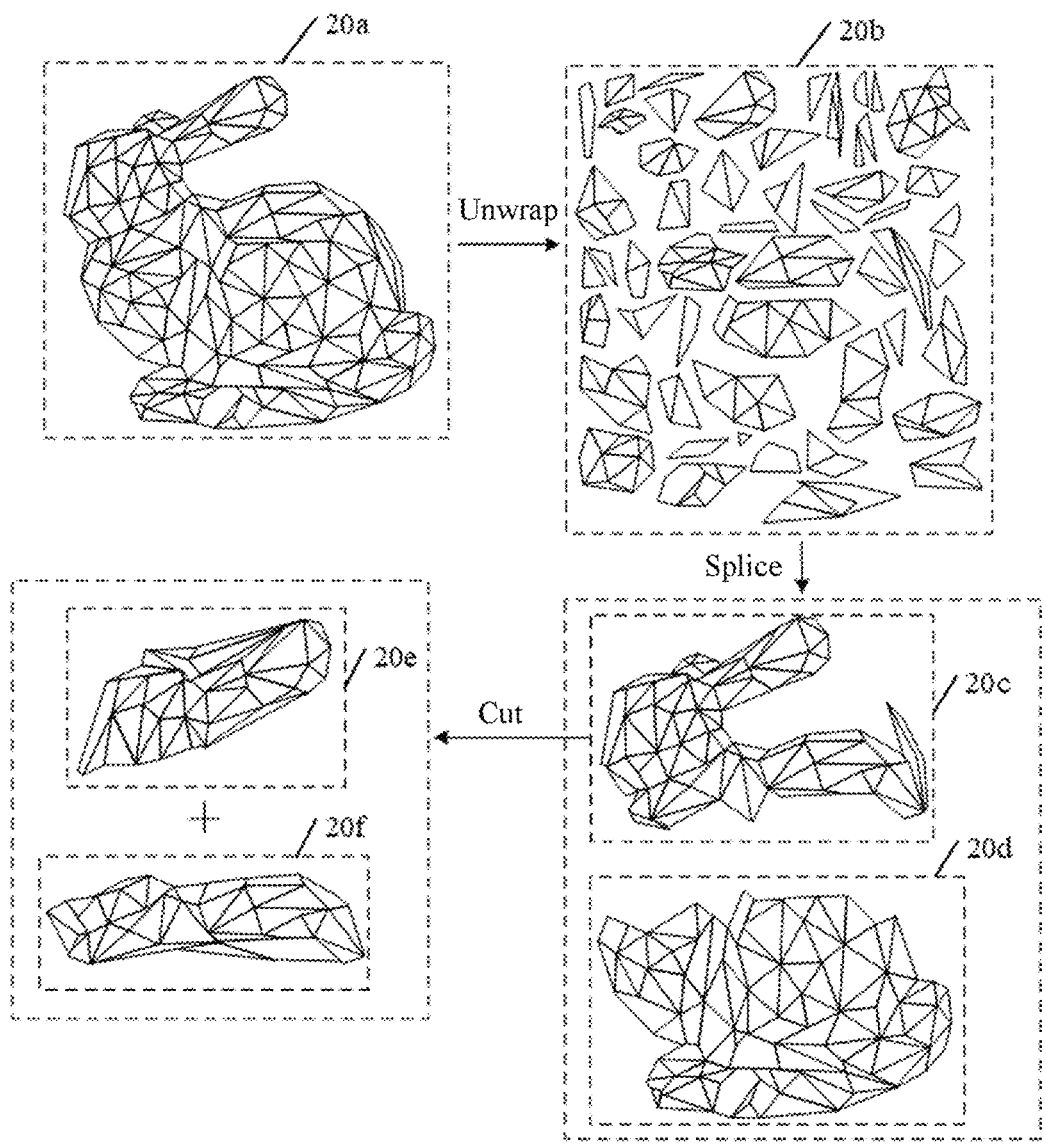
FIG. 2 is a scenario diagram of model cutting and unwrapping according to one or more aspects described herein.

FIG. 2 is an example scenario diagram of model cutting and unwrapping. As shown in FIG. 2, in a rendering scenario of a three-dimensional mesh model, a UV cutting unwrapping tool in a user terminal may be enabled. In the UV cutting unwrapping tool, a three-dimensional mesh model 20a may be obtained. The three-dimensional mesh model 20a may be a three-dimensional model formed by a polygon (for example, a graph like a triangle or a quadrilateral). The three-dimensional model may include a vertex of the polygon, an edge of the polygon, and a plane in which the polygon is located. The user terminal may perform UV unwrapping on the three-dimensional mesh model 20a. For example, edges of polygons in the three-dimensional mesh model 20a are used as cutting lines, and the three-dimensional mesh model 20a is partitioned into multiple model blocks. Each model block may be formed by one polygon in the three-dimensional mesh model 20a, or a few consecutive polygons (for example, a quantity threshold may be set, and a quantity of polygons included in each model block may be less than or equal to the quantity threshold). Therefore, each model block may be sequentially unwrapped into a two-dimensional space (for example, a UV space), and an example unwrapping result of the model block in the two-dimensional space is shown in an area 20b. In this case, the unwrapping result in the area 20b may be referred to as an initial unwrapping result corresponding to the three-dimensional mesh model 20a. When the three-dimensional mesh model 20a is unwrapped into a two-dimensional plane, the polygon in the three-dimensional mesh model 20a may generate some distortion after unwrapping. To reduce a degree of distortion resulting from the unwrapping, an effort may be made to improve regularity of an unwrapping result.

The unwrapping result shown in the area 20b may be multiple independent two-dimensional meshes. In the UV cutting and unwrapping tool, multiple independent two-dimensional meshes in the area 20b may be spliced to obtain a two-dimensional mesh model 20c and a two-dimensional mesh model 20d. The two-dimensional mesh model 20c and the two-dimensional mesh model 20d herein may be referred to as UV islands. When the cutting unwrapping effect of the two-dimensional mesh model 20c does not meet or satisfy an unwrapping effect condition (an effective condition of UV unwrapping may be preferentially configured), a rollback mechanism in the UV cutting unwrapping tool may be enabled, that is, a splicing operation is returned to (e.g., followed by) another cutting operation in the UV cutting unwrapping tool, whereby the two-dimensional mesh model 20c is re-cut. A computer device (for example, a user terminal or a server) may first obtain a cut path set corresponding to the two-dimensional mesh model 20c, where the cut path set may include one or more candidate cut paths, and different candidate cut paths may correspond to different cut results. An optimal target cut path may be selected from the cut path set, and the two-dimensional mesh model 20c is cut by using the target cut path. A cut result obtained includes a two-dimensional mesh model 20e and a two-dimensional mesh model 20f. The two-dimensional mesh model 20e and the two-dimensional mesh model 20f may further be cut until a final unwrapping result of the three-dimensional mesh model 20a meets or satisfies the unwrapping effect condition. By selecting an optimal cut path corresponding to the two-dimensional mesh model, the two-dimensional mesh model is cut, and the rollback mechanism in the UV cutting unwrapping tool is used for ensuring validity of a cutting unwrapping result.

The data processing method may be performed by a computer device. The computer device may be a user terminal (for example, the user terminal 10a shown in FIG. 1) or a server (for example, the server 10d shown in FIG. 1).

Figure 3A:
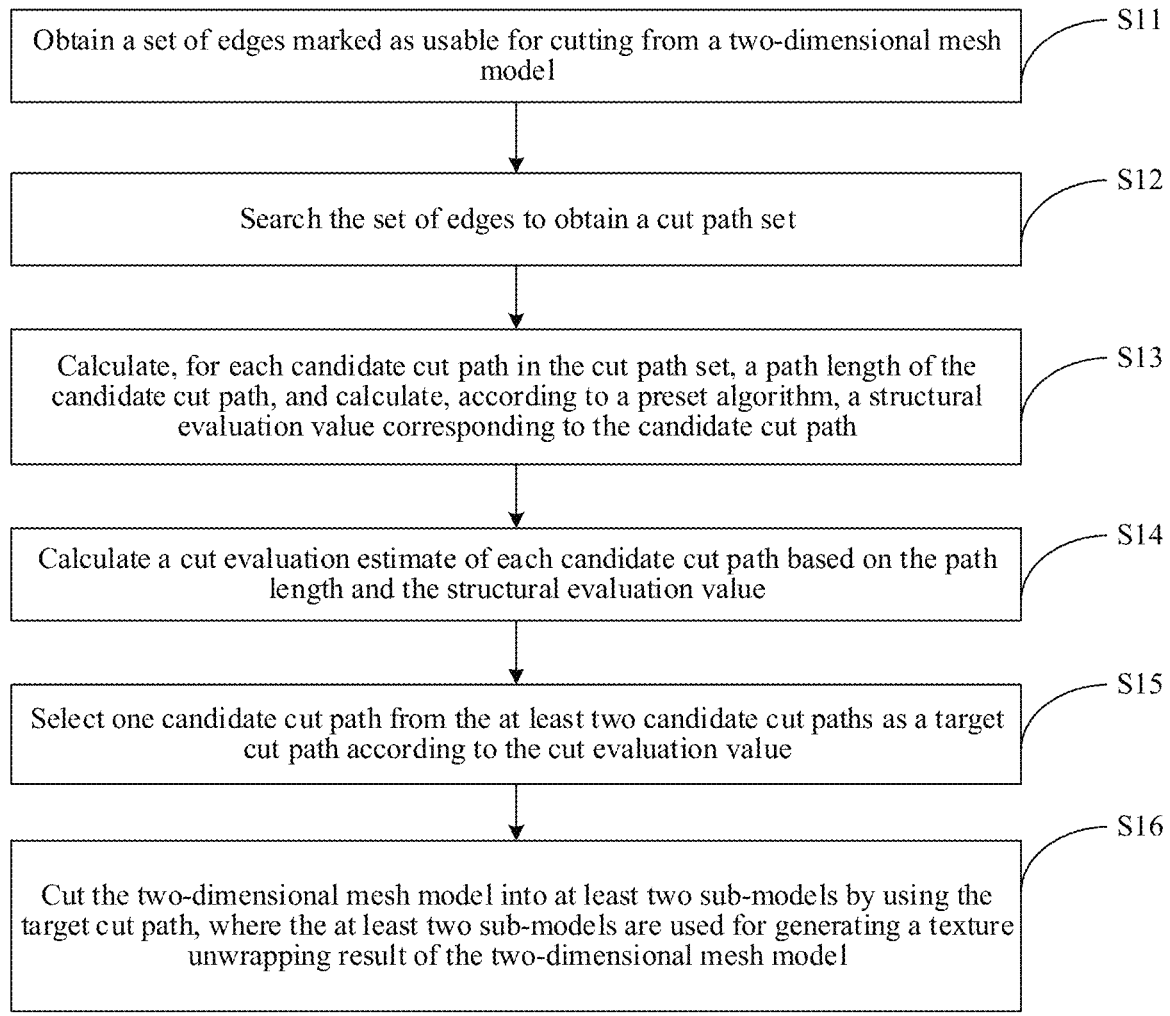
FIG. 3A is a schematic flowchart of a data processing method according to one or more aspects described herein.

FIG. 3A is an example flowchart of a data processing method according to aspects described herein.

Step S11: Obtain a set of edges, marked as usable for cutting, from a two-dimensional mesh model.

The two-dimensional mesh model is a connected two-dimensional mesh in at least one two-dimensional mesh obtained by performing two-dimensional unwrapping on a virtual three-dimensional model.

Because a cutting manner of the two-dimensional mesh model affects subsequent processing effect and efficiency of a surface texture of the virtual three-dimensional model, not all edges of the two-dimensional mesh model can be used for cutting. In some examples, edges that can be used for cutting may include a historical cut edge, a hard edge, a blocked edge, and the like in the two-dimensional mesh model. A historical cut edge may be an edge on a cut path when the two-dimensional mesh model is cut manually or by a computer device when previous processing is performed on the two-dimensional mesh model. A hard edge may be an edge whose light shadow change amount between two sides of the edge in the two-dimensional mesh model are greater than a light shadow change threshold. A blocked edge may be an invisible edge located in a part of the virtual three-dimensional model that is blocked in a usage scenario. In some arrangements, at least some of these edges may be marked by a computer device. In some other arrangements, at least some of these edges may be manually marked by a person skilled in the art. In various arrangements, a total quantity of edges marked as usable for cutting in the two-dimensional mesh model is less than a total quantity of edges in the two-dimensional mesh model.

Step S12: Search the set of edges to obtain a cut path set.

The cut path set includes at least two candidate cut paths. Each candidate cut path includes at least one edge of the obtained set edges (Step S11), and the at least one edge cuts the two-dimensional mesh model into at least two separated two-dimensional mesh models.

Step S13: Calculate, for each candidate cut path in the cut path set, a path length of the candidate cut path, and calculate, according to a preset algorithm, a structural evaluation value corresponding to the candidate cut path.

The structural evaluation value represents regularity degrees of shapes of at least two sub-models obtained by cutting the two-dimensional mesh model by using the candidate cut path.

Step S14: Calculate a cut evaluation estimate of each candidate cut path based on the path length and the structural evaluation value.

Step S15: Select one candidate cut path from the at least two candidate cut paths as a target cut path according to the cut evaluation value.

Step S16: Cut the two-dimensional mesh model into at least two sub-models by using the target cut path, where the at least two sub-models are used for generating a texture unwrapping result of the two-dimensional mesh model.

Correspondingly, the computer device may include:
a path obtaining module, configured to obtain a set of edges, marked as usable for cutting, from a two-dimensional mesh model, the two-dimensional mesh model being a connected two-dimensional mesh in at least one two-dimensional mesh obtained by performing two-dimensional unwrapping of a virtual three-dimensional model; and search the set of edges to obtain a cut path set, the cut path set including at least two candidate cut paths, each candidate cut path including at least one edge of the set of edges, and the at least one edge cutting the two-dimensional mesh model into at least two separated two-dimensional mesh models;
a path selection module, configured to: calculate, for each candidate cut path in the cut path set, a path length of the candidate cut path, and calculate, according to a preset algorithm, a structural evaluation value corresponding to the candidate cut path, the structural evaluation value representing regularity degrees of shapes of at least two sub-models obtained by cutting the two-dimensional mesh model by using the candidate cut path; calculate a cut evaluation estimate of each candidate cut path based on the path length and the structural evaluation value; and select one candidate cut path from the at least two candidate cut paths as a target cut path according to the cut evaluation value; and
a model cutting module, configured to cut the two-dimensional mesh model into at least two sub-models by using the target cut path; the at least two sub-models being used for generating a texture unwrapping result of the two-dimensional mesh model.

According to aspects described herein, a process of determining a target cut path of a two-dimensional network model considers a shape change of a sub-model obtained by cutting and an impact of subsequent mapping back to a three-dimensional mesh on a rendering effect of a surface texture of a virtual three-dimensional model. Using this process, a candidate cut path is formed only by using some edges, and a regularity program of a shape is considered when the target cut path is selected, so that a determined cutting solution can reduce deformation during unwrapping of the sub-model after cutting and reduce impact on a rendering effect of a surface texture of the virtual three-dimensional model. Accordingly, a processing effect and processing efficiency of the surface texture of the three-dimensional model may be improved.

Figure 3B:
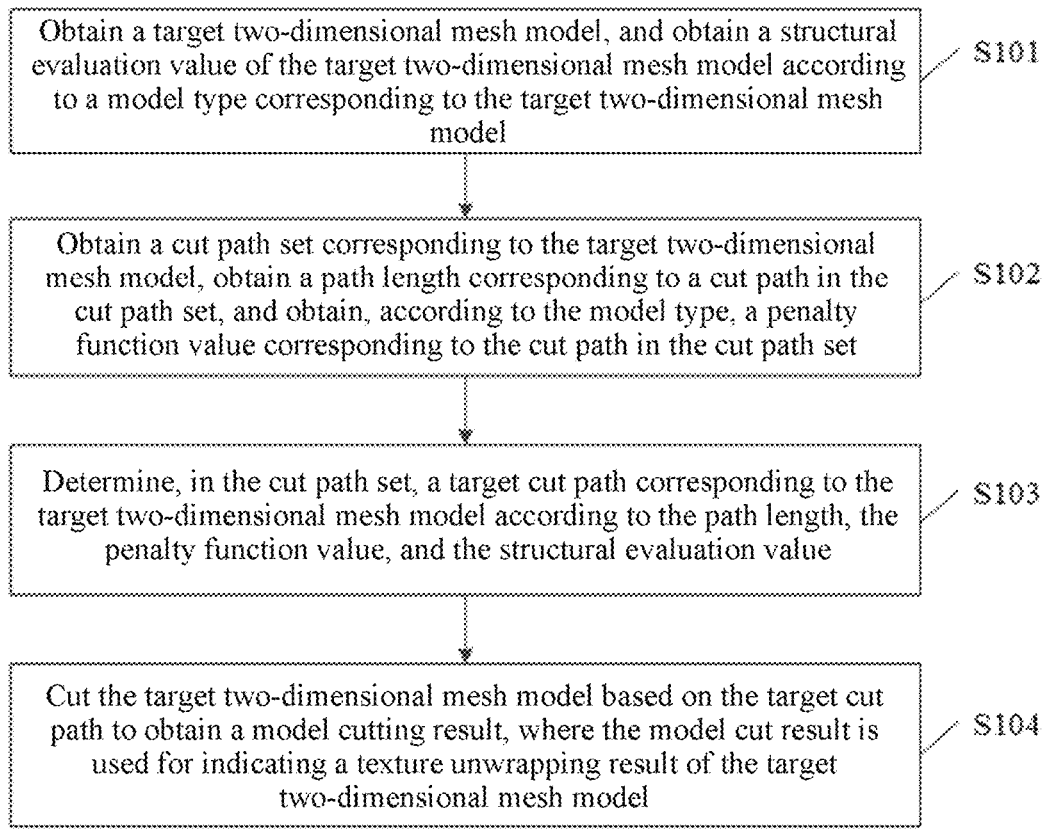
FIG. 3B is a schematic flowchart of a data processing method according to one or more aspects described herein.

FIG. 3B is another example flowchart of a data processing method. As shown in FIG. 3B, the data processing method may include the following steps S101 to step S104.

Step S101: Perform dimension reduction processing on a three-dimensional mesh model to obtain a two-dimensional mesh model (also referred to as a target two-dimensional mesh model), and obtain a structural evaluation value of the two-dimensional mesh model according to a model type corresponding to the two-dimensional mesh model.

According to some arrangements, in a rendering scenario of the three-dimensional mesh model, a computer device may perform dimension reduction processing on the three-dimensional mesh model (for example, the example three-dimensional mesh model 20a of FIG. 2) to obtain the two-dimensional mesh model, so as to perform subsequent data processing on the two-dimensional mesh model in a two-dimensional space. For example, the computer device may divide the three-dimensional mesh model into one or more three-dimensional mesh blocks, unwrap (i.e., UV unwrapping) the one or more three-dimensional mesh blocks in a texture space to obtain one or more two-dimensional mesh models (e.g., the two-dimensional mesh model 20c and the two-dimensional mesh model 20d in the example of FIG. 2). In the one or more two-dimensional mesh models, a two-dimensional mesh model satisfying a model cutting condition may be determined as a target two-dimensional mesh model. The model cutting condition may be a preset specific model type, such as a ring type, a branch type, a convex hull type, and an asymmetric type. When a model type of any two-dimensional mesh model in the one or more two-dimensional mesh models meets the foregoing model cutting condition, the two-dimensional mesh model may be determined as a target two-dimensional mesh model. For example, a ring model type, a branch model type, a convex hull model type, and an asymmetric model type in the one or more two-dimensional mesh models may be considered as the foregoing target two-dimensional mesh model, and the target two-dimensional mesh model may be 2UV, or may be 1UV. Aspects described herein are not limited to these model types or UV approaches. By performing UV unwrapping on the three-dimensional mesh model, and reducing three-dimensional information in the three-dimensional mesh model to two dimensions for processing, it can be ensured that a texture map corresponding to the three-dimensional mesh model does not generate tensile deformation.

In some examples, the structural evaluation value of the set of two-dimensional mesh models may be obtained by:
determining a preset structure in each model in the set;
calculating a value of a preset feature of the preset structure in each model; and
determining a sum of values of preset features corresponding to the models in the set as the structural evaluation value of the set.

The set of two-dimensional mesh models may include at least one two-dimensional mesh model.

For example, when the set of two-dimensional mesh models includes only the target two-dimensional mesh model, a method for determining a structural evaluation value of the target two-dimensional mesh model may include:

determining a preset structure in the target two-dimensional mesh model; and calculating a value of a preset feature of the preset structure as a structural evaluation value of the target two-dimensional mesh model.

In another example, when the set of two-dimensional mesh model includes at least two sub-models obtained after the target two-dimensional mesh model is cut, the method for determining the structural evaluation value of the set may include:

determining a preset structure in each sub-model in the set;

calculating a value of a preset feature of the preset structure in each sub-model; and determining a sum of values of preset features corresponding to the sub-models in the set as the structural evaluation value of the set.

In some arrangements, after the two-dimensional mesh model is determined, a structural evaluation value of the two-dimensional mesh model may be obtained according to a model type corresponding to the two-dimensional mesh model. The structural evaluation value may be an irregularity degree score of a shape of the two-dimensional mesh model, such as a return value of a penalty function without cutting of the two-dimensional mesh model. The structural evaluation value may be used for determining an optimal cut path (which may also be referred to as a target cut path) corresponding to the two-dimensional mesh model. For example, when the two-dimensional mesh model is corresponding to multiple cut paths, the structural evaluation value may be used as a filtering condition of the target cut path. In some examples, in addition to the foregoing structural evaluation value, the target cut path may have another filtering condition. Various filtering conditions may be used and is not limited. Different model types may correspond to different penalty functions, and different penalty functions may be used for implementing different cutting purposes. The penalty function may also be referred to as a sequence unconstrained minimization function. A penalty function is constructed by adding an equality constraint condition and an inequality constraint condition to an original target function by using a properly defined compound function, so that constraints are eliminated, and then a series of unconstrained optimization problems are solved. In other words, the purpose of the penalty function is to convert a constrained optimization problem into a series of unconstrained problems.

In some arrangements, the preset structure is a candidate hole structure, and calculating the value of the preset feature of the preset structure includes: obtaining, according to a boundary area corresponding to the candidate hole structure, a quantity of hole structures as the value of the preset feature. For example, when the model type of the two-dimensional mesh model is a ring type, an Euler characteristic may be used for determining a candidate hole structure in the two-dimensional mesh model, and a quantity of hole structures in the two-dimensional mesh model is obtained according to a boundary area corresponding to the candidate hole structure, and used as a structural evaluation value of the two-dimensional mesh model. The two-dimensional mesh model of a ring type may be a two-dimensional mesh model including a hole structure, where a proportion of an area of a hole to a total area of the model is greater than a preset first proportion threshold (may be set according to an actual requirement, which is not limited in this application). The hole structure may be considered as a circular structure obtained after the two-dimensional mesh model is unwrapped in the texture space, for example, a two-dimensional mesh with a hollow, and a hole structure existing in the two-dimensional mesh model is determined as a candidate hole structure.

Figure 4:
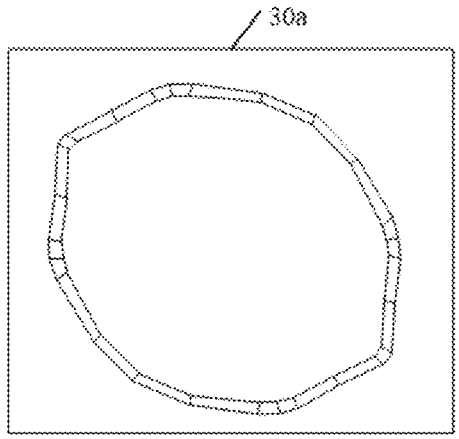
FIG. 4 is a schematic diagram of a two-dimensional mesh model of a ring type according to one or more aspects described herein.

To calculate a hole structure of a polygon in a two-dimensional space (for example, a UV space), a Boolean operation is performed on these polygons to obtain a polygon that carries a hole structure, so as to calculate an area of the hole structure. However, because a Boolean operation process needs to perform an intersection operation, a rational number needs to be accurately solved, which is relatively time-consuming. Therefore, according to aspects described herein, an approximate method may further be used for calculating a quantity of hole structures included in the two-dimensional mesh model. For example, the Euler characteristic may be used for calculating the quantity of hole structures included in the two-dimensional mesh model. If there is a hole structure in the two-dimensional mesh model, an area (a boundary area) of all boundaries of the hole structure may be calculated, and a boundary other than a boundary corresponding to a maximum boundary area may be used as a hole structure boundary. Further, a hole structure boundary whose boundary area is greater than an area threshold (which may be set according to actual requirements, or based on other methods without limitation) may be determined as a quantity of hole structures in the two-dimensional mesh model. Further, the quantity of hole structures may be used as the structural evaluation value of the two-dimensional mesh model. By using the foregoing approximate method, calculation efficiency of a boundary area corresponding to a hole structure can be improved. Referring to FIG. 4, which is a schematic diagram of an example two-dimensional mesh model of a ring type, a two-dimensional mesh model 30a (two-dimensional mesh model) belongs to a two-dimensional mesh model of a ring type, and the two-dimensional mesh model 30a includes a hole structure. Accordingly, in the example of FIG. 4, a structural evaluation value corresponding to the two-dimensional mesh model may be 1.

In some arrangements, the preset structure is at least two inscribed circles in an outer contour of the sub-model, and calculating a value of a preset feature of the preset structure includes: obtaining a center-of-circle connection line segment between the at least two inscribed circles; constructing a graph structure by using centers of the at least two inscribed circles as nodes and using the center-of-circle connection line segment as an edge; and determining, according to a branch length corresponding to a branch in the graph structure, a quantity of branches as the value of the preset feature. For example, when the model type of the two-dimensional mesh model is a branch type (which may also be referred to as a multi-branch type), x inscribed circles in the outer contour corresponding to the two-dimensional mesh model may be determined according to the branch type, and a center-of-circle connection line segment between the x inscribed circles is obtained, where x is a positive integer greater than 1. For example, x may be 2, 3, or another integer greater than 1. A graph structure corresponding to the two-dimensional mesh model is constructed by using centers of the x inscribed circles as nodes and the center-of-circle connection line segment as an edge. A quantity of branches corresponding to the two-dimensional mesh model is determined according to a branch length corresponding to a branch in the graph structure, and the quantity of branches is used as the structural evaluation value of the two-dimensional mesh model. The two-dimensional mesh model of a multi-branch type may be a two-dimensional mesh model with a long skeleton and multiple branches. The skeleton of the two-dimensional mesh model may be obtained by constructing a Voronoi diagram of the outer contour of the two-dimensional mesh model. An inscribed circle in the outer contour corresponding to the two-dimensional mesh model may be quickly obtained by means of calculation based on the Voronoi diagram, and all inscribed circles are the skeleton structure of the two-dimensional mesh model. Further, a graph structure may be established by using centers of these inscribed circles as nodes and a connection relationship between the centers. In the graph structure, a connection length (a shortest path between two nodes) between end nodes is obtained, where a longest connection length is used as a backbone of the skeleton structure, and a branch length corresponding to another branch other than the backbone is calculated. A quantity of branches corresponding to the two-dimensional mesh model is counted. In one example, only branches having a branch length greater than a length threshold (which may be set according to an actual requirement, and is not limited in this application) are counted as part of the quantity of branches. The Voronoi diagram may be formed by a group of continuous polygons, each formed by connecting perpendicular bisectors of straight lines of two neighboring points. For example, a triangle network (a mesh model including triangles) may be constructed based on vertices in the two-dimensional mesh model, and a circumcircle center of each triangle in the triangle network is found, so as to connect the circumcircle center of the adjacent triangle to form a polygon network in which each triangle vertex is a generator. An inscribed circle in the outer contour corresponding to the two-dimensional mesh model is determined by using a Voronoi diagram, thereby improving effectiveness of the inscribed circle.

Figure 5:
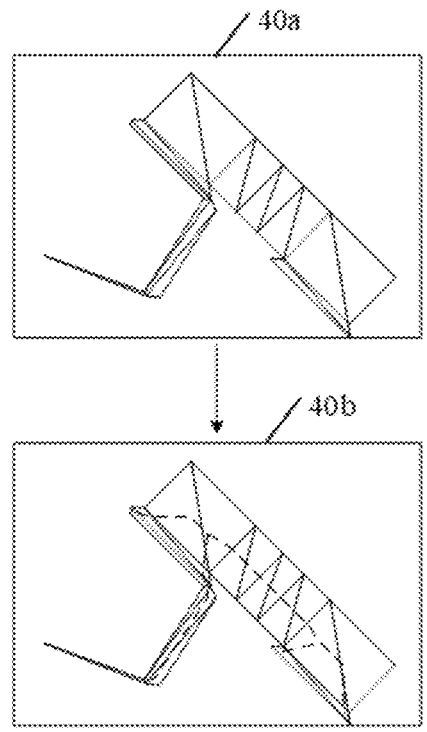
FIG. 5 is a schematic diagram of a two-dimensional mesh model of a branch type according to one or more aspects described herein.

FIG. 5 is a schematic diagram of an example two-dimensional mesh model of a branch type. As shown in FIG. 5, a two-dimensional mesh model 40a (that is, a two-dimensional mesh model) belongs to a two-dimensional mesh model of a branch type, where multiple inscribed circles in an outer contour of the two-dimensional mesh model 40a may be obtained (a quantity of inscribed circles is denoted as x, and x is a positive integer greater than 1), and centers of the x inscribed circles are connected to obtain a center-of-circle connection line segment between the x inscribed circles. The center-of-circle connection line segment between the x inscribed circles may be considered as a skeleton structure of the two-dimensional mesh model 40a (e.g., a dashed line in the two-dimensional mesh model 40b shown in FIG. 5), and a longest branch in the skeleton structure of the two-dimensional mesh model 40a may be referred to as a primary branch, and a quantity of branches in the two-dimensional mesh model 40a may be determined based on a length of another branch other than the primary branch.

In some arrangements, the preset structure is a convex hull of an outer contour point set of a model, and calculating a value of a preset feature of the preset structure includes: obtaining a convex hull area corresponding to the convex hull, obtaining a model area corresponding to the model, and using a ratio of the model area to the convex hull area as the value of the preset feature. For example, when the model type of the two-dimensional mesh model is a convex hull type, the convex hull of the outer contour point set corresponding to the two-dimensional mesh model may be obtained. Further, the convex hull area corresponding to the convex hull may be obtained, the model area corresponding to the two-dimensional mesh model may be obtained, and a ratio of the model area to the convex hull area may be determined and used as a structural evaluation value of the two-dimensional mesh model. The two-dimensional mesh model of a convex hull type may be a two-dimensional mesh model whose convex hull ratio is less than a preset second ratio threshold (which is set based on an actual requirement and is not limited herein). For example, when a ratio of a model area of the two-dimensional mesh model itself to an area of a model convex hull polygon is less than the second ratio threshold, it is determined that the two-dimensional mesh model belongs to the convex hull type.

Figures 6, 7:
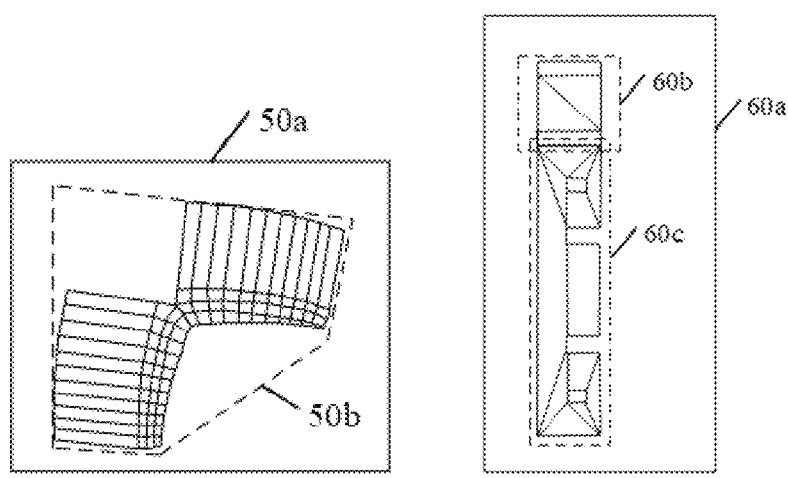
FIG. 6 is a schematic diagram of a two-dimensional mesh model of a convex hull type according to one or more aspects described herein.
FIG. 7 is a schematic diagram of a two-dimensional mesh model of an asymmetric type according to one or more aspects described herein.

FIG. 6 is a schematic diagram of an example two-dimensional mesh model of a convex hull type. A two-dimensional mesh model 50a (two-dimensional mesh model) shown in FIG. 6 belongs to a two-dimensional mesh model of a convex hull type, and a convex hull of an outer contour point set corresponding to the two-dimensional mesh model 50a is a polygon 50b shown in FIG. 6. A convex hull area corresponding to the polygon 50b may be obtained, where the convex hull area corresponding to the polygon 50b is greater than a model area of the two-dimensional mesh model 50a, and further, a ratio of the model area to the convex hull area may be determined and used as a structural evaluation value of the two-dimensional mesh model, thereby improving the validity of the structural evaluation value.

In some arrangements, the preset structure is a center point of the model, and calculating a value of a preset feature of the preset structure includes: determining a symmetry axis of the model by using the center point; and determining an average error between a target point and a mapping point in the model by using the symmetry axis, and obtaining, according to the average error, a symmetry error corresponding to the model as the value of the preset feature. For example, when the model type of the two-dimensional mesh model is an asymmetric type, the center point of the two-dimensional mesh model may be obtained, and a symmetry axis of the two-dimensional mesh model is determined by using the center point. An average error between a target point and a mapping point in the two-dimensional mesh model is determined by using the symmetry axis, a symmetric error corresponding to the two-dimensional mesh model is obtained according to the average error, and the symmetric error is used as the structural evaluation value of the two-dimensional mesh model. The two-dimensional mesh model of the asymmetric type may be a two-dimensional mesh model that has certain level of symmetry but might not be completely symmetrical. By evenly scattering rays from the center point of the two-dimensional mesh model as the symmetry axis (e.g., in some cases, only 180 degrees of coverage is required), a position of an optimal symmetry axis is found, and then the average error between the mapping point and the target point may be calculated by using mirror mapping, and the average error is used as the symmetry error of the two-dimensional mesh model. By using the average error as the structural evaluation value, the accuracy and validity of the structural evaluation value can be improved.

FIG. 7 is a schematic diagram of an example two-dimensional mesh model of an asymmetric type. As shown in FIG. 7, a two-dimensional mesh model 60a (two-dimensional mesh model) belongs to a two-dimensional mesh model of an asymmetric type, and the two-dimensional mesh model 60a may include a mesh block 60b and a mesh block 60c, where the mesh block 60c is a symmetric two-dimensional mesh, the mesh block 60b is an asymmetric two-dimensional mesh, and the two-dimensional mesh model 60a formed by combining the mesh block 60b and the mesh block 60c belongs to an asymmetric type.

Referring again to FIG. 3B, Step S102: Obtain a cut path set corresponding to the two-dimensional mesh model, obtain a path length corresponding to a cut path in the cut path set, and obtain, according to the model type, a penalty function value corresponding to the cut path in the cut path set.

In some arrangements, the computer device may mark a historical cut edge, a hard edge, and/or a blocked edge in the two-dimensional mesh model to obtain marked edges in the two-dimensional mesh model. The hard edge may refer to an edge whose light shadow change amount between two sides of the boundary in the two-dimensional mesh model is greater than a light shadow change threshold. A path start point and a path end point are determined in the historical cut edge of the two-dimensional mesh model, a shortest cut path is determined in the marked edges of the two-dimensional mesh model according to the path start point and the path end point, and the shortest cut path is added to the cut path set. The cut path set may be a combination of all tangents in the two-dimensional mesh model.

When the two-dimensional mesh model is cut, not all mesh edges in the two-dimensional mesh model are suitable for cutting. Because a performance effect of a texture in a two-dimensional space needs to be considered, for example, a change near a soft edge is required to be gentle, discontinuity of textures on both sides may be easily caused by cutting the soft edge, and artifacts may result. Therefore, in a process of obtaining the cut path set, the following types of mesh edges in the two-dimensional mesh model may be marked: a two-dimensional mesh boundary (which may also be referred to as a UV boundary, or a historical cut edge), such as a boundary edge of each UV island before splicing of the two-dimensional mesh model (e.g., an original cut path, which may apparently be used as a cut path of a rollback mechanism); a hard edge, in contrast to a soft edge, where the hard edge requires strong contrast between two sides of the boundary, and is usually suitable for cutting (and in a case of high UV texture resolution, all hard edges may be cut); an invisible edge (which may be referred to as a blocked edge), where when an edge in the two-dimensional mesh model is shielded in a scenario, it is identified as an invisible edge, and this edge may be cut regardless of an attribute of the edge, because even if a poor rendering effect is caused, impact of the edge is very small because the edge is invisible; and a boundary of a preposed UV island, where for example, when a 2UV island is automatically processed, a 1UV has generally completed UV unwrapping, and a 1UV-based cutting condition may be used as a cutting manner of 2UV.

In some examples, priorities of the foregoing historical cut edge (two-dimensional mesh boundary), the hard edge, and the blocked edge (invisible edge) may be higher than a priority of a boundary (a cutting condition of 1UV) of the preposed UV island. Therefore, when searching for a cut path for the two-dimensional mesh model, searching may be preferentially performed on the historical cut edge, the hard edge, and the blocked edge marked in the two-dimensional mesh model. If no cut path is found in the historical cut edge, the hard edge, and the blocked edge, the boundary of the preposed UV island may be introduced, and the cut path may be searched for in the historical cut edge, the hard edge, the blocked edge, and the boundary of the preposed UV island. The foregoing historical cut edge, hard edge, and blocked edge may be set to the same priority. The foregoing historical cut edge, hard edge, blocked edge, and 1UV boundary are merely examples of boundary types for marking and other boundary types may be used. When another boundary type is used for searching for a cut path, a boundary selection condition of the boundary type may be modeled, and the boundary type of the cut path is added to a path search algorithm. Various boundary types of the cut path may be used and is not limited.

A feasible cut path combination can be found based on the marked edges in the two-dimensional mesh model. A path search method may use a path search algorithm such as Dijkstra and Floyd, which is not limited in this application. Because the cut path of the two-dimensional mesh model cannot be looped, and the two-dimensional mesh model may be cut off when the cut path is being cut, a path start point and a path end point of the cut path of the two-dimensional mesh model may be selected at boundary (for example, a historical cut edge) points, and an invalid cut path that is completely along the boundary may also be filtered out. For example, a cut path of each UV island of the two-dimensional mesh model before splicing may be filtered out.

Figure 8:
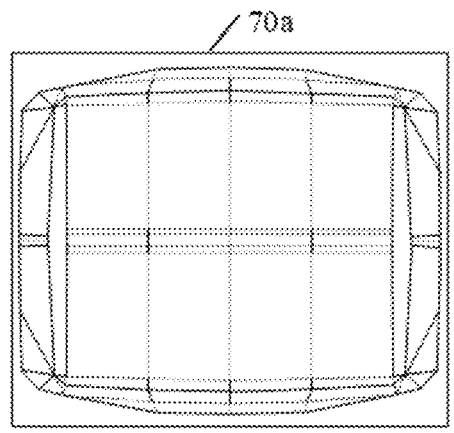
FIG. 8 is a boundary marking diagram of a two-dimensional mesh model according to one or more aspects described herein.

FIG. 8 is an example boundary marking diagram of a two-dimensional mesh model. As shown in FIG. 8, a two-dimensional mesh model 70a is a two-dimensional mesh model that carries marked edges. It is assumed that a 1UV boundary (a boundary of a preposed UV island) may be represented as blue, a hard edge may be represented as green, and a blocked edge (an invisible edge) may be represented as red, that is, three primary colors. A combination of the foregoing three boundary types may follow a three primary color mixing principle on display. For example, when an edge in the two-dimensional mesh model is blue-green (blue superposed on green), it indicates that the edge may be marked as both a 1UV boundary and a hard edge. When an edge in the two-dimensional mesh model is purple (blue superposed on red), it indicates that this edge can be marked as both a 1UV edge and an invisible edge. Marking different boundary types in the two-dimensional mesh model based on different colors is only an example, and edges of different boundary types may also be marked in another manner. As shown in FIG. 8, black solid lines may represent common edges (e.g., unmarked edges) in the two-dimensional mesh model 70a, gray solid lines indicate that these edges are both 1UV boundaries in the two-dimensional mesh model 70a and hard edges in the two-dimensional mesh model 70a, and black dotted lines indicate that these edges are only hard edges in the two-dimensional mesh model 70a.

In some arrangements, when the cut path set is obtained, a manual path acknowledgment operation may further be introduced into a specific process node of the path search algorithm. For example, when the path search algorithm executes to the specific process node, a user may be notified to acknowledge a cut path selected by the path search algorithm. If the user indicates that the cut path selected by the path search algorithm is an invalid path, the cut path may be deleted. Alternatively, the user may manually select a shortest cut path, and add the shortest cut path to the cut path set. By introducing a manual path acknowledgement in a process of obtaining the cut path set, validity of the cut path can be further ensured, and filtering efficiency of the target cut path can be accelerated. By marking multiple boundary types such as a historical cut edge, a hard edge, a blocked edge (an invisible edge), and a 1UV boundary in the two-dimensional mesh model, coverage and accuracy of the cut path in the cut path set can be improved, and a cutting effect of the cut path further improved.

In some embodiments, the computer device may select any cut path (a cut path p) from the cut path set to obtain a path length $l_p$ corresponding to the cut path p, and obtain a penalty function corresponding to the two-dimensional mesh model according to the model type, where p is a positive integer less than or equal to a quantity of cut paths in the cut path set. Further, a quantity of connections (that is, a total quantity of edges constituting the cut path p) of the cut path p may be obtained, and the two-dimensional mesh model is cut based on the cut path p to obtain the quantity of cut communication corresponding to the cut path p (that is, a total quantity of sub-models obtained by cutting the two-dimensional mesh model). If the quantity of connections of the cut path p, the quantity of cut communication corresponding to the cut path p, and the cut path p meet a constraint condition in the penalty function, a penalty function value $\omega_p$ corresponding to the cut path p is outputted by using the penalty function. If the quantity of connections of the cut path p, the quantity of cut communication corresponding to the cut path p, and the cut path p do not meet the constraint condition in the penalty function, a fixed value may be returned for the penalty function value $\omega_p$ of the cut path p, where the fixed value is used for indicating to discard the cut path p from the cut path set. The quantity of connections of the cut path p may be a quantity of consecutive boundary paths in the cut path p. Generally, a quantity of connections of one cut path is 1, which indicates that the two-dimensional mesh model may be cut once not multiple times at a time based on one cut path. The quantity of cut communication corresponding to the cut path p may be a quantity of cut two-dimensional mesh models obtained after the two-dimensional mesh model is cut based on the cut path p. Two-dimensional mesh models of different model types may correspond to different penalty functions, and different penalty functions may correspond to different constraint conditions, so as to achieve different cutting purposes.

In some embodiments, when the model type of the two-dimensional mesh model is a ring type, a penalty function of the ring type may be defined as shown in formula (1):

$$\operatorname*{argmin}_{p} \sum N_h(\hat{D}_i), \text{ s.t. } N_c(p) = 1, p \in A \text{ and } N_c(\hat{D}) = 1 \quad (1)$$

D may represent a two-dimensional mesh model (for example, a 2UV island), $\hat{D}$ may represent a final cutting result of the two-dimensional mesh model D, and $\hat{D}_i$ may represent a two-dimensional mesh model processed by the two-dimensional mesh model D at an ith (i is a positive integer) time. In a process of cutting the two-dimensional mesh model D, multiple times of cutting processing may be performed on the two-dimensional mesh model D (for example, cutting the two-dimensional mesh model D based on the cut path p, so that cutting processing may be continued on the two-dimensional mesh model obtained after the cutting). A may represent a cut path set corresponding to the two-dimensional mesh model D. $N_h(\hat{D}_i)$ may represent a quantity of hole structures included in a two-dimensional mesh model $\hat{D}_i$ obtained after ith processing. $N_c(\hat{D})=1$ may represent a quantity of connections of the cut path p. $N_c(\hat{D})$ may represent a quantity of cut communication of the two-dimensional mesh model D after cutting. $N_c(p)=1$, $p \in A$, and $N_c(\hat{D})=1$ may represent a constraint condition in the penalty function of the ring type.

$$\operatorname*{argmin}_{p} \sum N_h(\hat{D}_i)$$

may represent a value of p when a minimum value of $\Sigma N_h(\hat{D}_i)$ is taken. When the two-dimensional mesh model D is of the ring type, a penalty function value $\omega_p$ corresponding to the cut path p may be obtained by means of calculation by using the foregoing formula (1), and the quantity of hole structures in the two-dimensional mesh model may be reduced based on the formula (1).

In some arrangements, when the model type of the two-dimensional mesh model is a branch type, a penalty function of the branch type may be defined as shown in formula (2):

$$\operatorname*{argmin}_{p} \sum B(\hat{D}_i), \text{ s.t. } N_c(p) = 1, p \in A \text{ and } N_c(\hat{D}) = 2 \quad (2)$$

$B(\hat{D}_i)$ may represent a quantity of branches in a two-dimensional mesh model $\hat{D}_i$ obtained after ith processing. $N_c(p)=1$, $p \in A$, and $N_c(\hat{D})=2$ may represent a constraint condition in the penalty function of the branch type.

$$\operatorname*{argmin}_{p} \sum B(\hat{D}_i)$$

may represent a value of p when a minimum value of $\Sigma B(\hat{D}_i)$ is taken. When the two-dimensional mesh model D is of the branch type, a penalty function value $\omega_p$ corresponding to the cut path p may be obtained by means of calculation by using the foregoing formula (2), and the quantity of branches in the two-dimensional mesh model may be reduced based on the formula (2).

In some arrangements, when the model type of the two-dimensional mesh model is a convex hull type, a penalty function of the convex hull type may be defined as shown in formula (3):

$$\operatorname*{argmax}_{p} \left( \sum \operatorname{area}(\hat{D}_i) / \sum \operatorname{area}_{CH}(\hat{D}_i) \right), \text{ s.t. } N_c(p) = 1, \quad (3)$$

$$p \in A \text{ and } N_c(\hat{D}) = 2 \text{ and } \left| \frac{\hat{D}_i}{D} - 0.5 \right| < \delta$$

$\operatorname{area}(\hat{D}_i)$ may be represented as a model area of a two-dimensional mesh model $\hat{D}_i$ obtained after ith processing, $\operatorname{area}_{CH}(\hat{D}_i)$ may represent a convex hull area of the two-dimensional mesh model $\hat{D}_i$ obtained after ith processing, and $\delta$ may represent a stop threshold of the foregoing formula (3). $N_c(p)=1$, $p \in A$, and $N_c(\hat{D})=2$, and $$\left| \frac{\hat{D}_i}{D} - 0.5 \right| < \delta$$

may represent a constraint condition in the penalty function of the branch type.

$$\underset{p}{\mathrm{argmax}} \left( \sum \mathrm{area}(\hat{D}_i) / \sum \mathrm{area}_{CH}(\hat{D}_i) \right)$$

may represent a value of p when a minimum value of $\Sigma \mathrm{area}(\hat{D}_i)/\Sigma \mathrm{area}_{CH}(\hat{D}_i)$ is taken. When the two-dimensional mesh model D is of the convex hull type, a penalty function value $\omega_p$ corresponding to the cut path p may be obtained by means of calculation by using the foregoing formula (3). Based on the formula (3), a ratio of the model area of the two-dimensional mesh model to the corresponding convex hull area may be increased, thereby improving convex hull utilization.

In some arrangements, when the model type of the two-dimensional mesh model is an asymmetric type, a penalty function of the asymmetric type may be defined as shown in formula (4):

$$\underset{p}{\mathrm{argmin}} \sum S(\hat{D}_i), \text{ s.t. } N_c(p) = 1, \ p \in A \text{ and } N_c(\hat{D}) = 2 \text{ and } S(D) < \varepsilon \quad (4)$$

$S(\hat{D}_i)$ may be represented as a symmetric error of a two-dimensional mesh model $\hat{D}_i$ obtained after ith processing, S(D) may represent a symmetric error of the two-dimensional mesh model D, and $\varepsilon$ may represent a stop threshold of the foregoing formula (4). $N_c(p)=1$, $p_\in A$ and $D_c(\hat{D})=2$, and $S(D)<\varepsilon$ may represent a constraint condition in the penalty function of the asymmetric type.

$$\underset{p}{\mathrm{argmin}} \sum S(\hat{D}_i)$$

may represent a value of p when a minimum value of $\Sigma S(\hat{D}_i)$ is taken. When the two-dimensional mesh model D is of the asymmetric type, a penalty function value $\omega_p$ corresponding to the cut path p may be obtained by means of calculation by using the foregoing formula (4), and symmetry of the two-dimensional mesh model may be improved based on the formula (4).

Referring again to FIG. 3B, Step S103: Determine, in the cut path set, a target cut path corresponding to the two-dimensional mesh model according to the path length, the penalty function value, and the structural evaluation value.

In some arrangements, for any cut path p in the cut path set, a cut evaluation value corresponding to the cut path p may be determined based on a path length $l_p$ of the cut path p, a penalty function value $\omega_p$ corresponding to the cut path p, and the structural evaluation value of the two-dimensional mesh model. By using a cut evaluation value corresponding to each cut path in the cut path set, an optimal cut path may be selected from the cut path set, and the optimal cut path is determined as the target cut path corresponding to the two-dimensional mesh model. The cut evaluation value may be used for evaluating a cut effect of the two-dimensional mesh model based on the cut path.

The cut path filtering process in the cut path set, which may be performed by a computer device, may include: obtaining a length optimization value (which may be denoted as $l_{best}$) and a penalty optimization value (which may be denoted as $\omega_{best}$) that are corresponding to the two-dimensional mesh model. The length optimization value $l_{best}$ and the penalty optimization value $\omega_{best}$ may be to-be-optimized variables. If the cut path p is a cut path selected for the first time in the cut path set, the length optimization value $l_{best}$ may temporarily be a path length $l_p$ corresponding to the cut path p, the penalty optimization value $\omega_{best}$ may be a penalty function value $\omega_p$ corresponding to the cut path p, and in this case, the cut path p may be temporarily determined as a current optimal cut path (which may be denoted as $p_{best}$). In some arrangements, an initial value may be separately set for the length optimization value $l_{best}$ and the penalty optimization value $\omega_{best}$. For example, both the initial values of the length optimization value $l_{best}$ and the penalty optimization value $\omega_{best}$ may be set to 0, or other values that are set based on an actual requirement or experience. Setting the initial values of the length optimization value $l_{best}$ and the penalty optimization value $\omega_{best}$ is not limited to these examples. The computer device may further obtain a length weighting parameter (which may be denoted as $\lambda_l$) associated with the length optimization value $l_{best}$ and a penalty weighting parameter (which may be denoted as $\lambda_\omega$) associated with the penalty optimization value $\omega_{best}$, where both the length weighting parameter $\lambda_l$ and the penalty weighting parameter $\lambda_\omega$ are fixed parameters, the length weighting parameter $\lambda_l$ is used for harmonizing the constraint condition of the path length, and the penalty weighting parameter $\lambda_\omega$ is used for harmonizing the constraint condition of the penalty function value, so that a finally selected target cut path is as short as possible and a penalty function value is as low as possible.

In some arrangements, a sum operation is performed on a product between the length weighting parameter $\lambda_l$ and the length optimization value $l_{best}$, and a product between the penalty weighting parameter $\lambda_\omega$ and the penalty optimization value $\omega_{best}$ to obtain a path filtering parameter of the two-dimensional mesh model, which may be represented as $\lambda_l l_{best}+\lambda_\omega \omega_{best}$, and the path filtering parameter may be used as a filtering factor used for filtering the optimal cut path in the cut path set. Further, a sum operation may be performed on a product between the length weighting parameter $\lambda_l$ and the path length $l_p$, and a product between the penalty weighting parameter $\lambda_\omega$ and the penalty function value $\omega_p$ to obtain a cut evaluation value of the cut path p, which may be represented as $\lambda_l l_p+\lambda_\omega \omega_p$. If the penalty function value $\omega_p$ is less than or equal to the structural evaluation value (the structural evaluation value may be denoted herein as $\phi$), and the cut evaluation value of the cut path p is less than or equal to the path filtering parameter, that is, $\omega_p \leq \phi$ and $\lambda_l l_p+\lambda_\omega \omega_p \leq \lambda_l l_{best}+\lambda_\omega \omega_{best}$, the cut path p is determined as the current optimal cut path (if $p_{best}=p$, that is, the current optimal cut path at this time is updated to the cut path p), the cut path p may be deleted from the cut path set. Further, the cut evaluation value $(\lambda_l l_p+\lambda_\omega \omega_p)$ of the cut path p may be determined and used as an updated path filtering parameter. For example, the length optimization value may be updated such that $l_{best}=l_p$, and the penalty optimization value may be updated such that $\omega_{best}=\omega_p$ that is, the length optimization value $l_{best}$ may be updated to $l_p$, and the penalty optimization value $\omega_{best}$ may be updated to $\omega_p$.

If the penalty function value $\omega_p$ is greater than the structural evaluation value $\phi$, or the cut evaluation value of the cut path p is greater than the path filtering parameter, that is, $\omega_p > \phi$ or $\lambda_l l_p+\lambda_\omega \omega_p > \lambda_l l_{best}+\lambda_\omega \omega_{best}$, the cut path p is deleted from the cut path set, and the path filtering parameter remains unchanged. For example, in this case, the cut path p is an invalid path, and the length optimization value $l_{best}$, the penalty optimization value $\omega_{best}$, and the current optimal cut path $p_{best}$ do not need to be updated.

After the cut path p is processed, a new cut path p+1 may be re-selected from the cut path set, a path length $l_{p+1}$ and a penalty function value $\omega_{p+1}$ corresponding to the cut path p+1 in the cut path set may be obtained, and a sum operation may be performed on a product between the length weighting parameter and the path length $l_{p+1}$, and a product between the penalty weighting parameter and the penalty function value $\omega_{p+1}$ to obtain a cut evaluation value of the cut path p+1. If the penalty function value $\omega_{p+1}$ is less than or equal to the structural evaluation value, and the cut evaluation value of the cut path p+1 is less than or equal to the updated path filtering parameter, the cut path p+1 is determined as the updated current optimal cut path. In this case, the current optimal cut path $p_{best}$=p+1, the cut path p+1 is deleted from the cut path set until the cut path set is an empty set, and the updated current optimal cut path is determined to be the target cut path. In other words, for all cut paths in the cut path set, the foregoing operations of the cut path p may be performed until the cut path set is empty, and the final current optimal cut path $p_{best}$ is determined as the target cut path corresponding to the two-dimensional mesh model. For example, when the cut path set is empty, the current optimal cut path $p_{best}$=p+3, and the cut path p+3 may be determined as the target cut path.

In some arrangements, when the cut path set is empty, the current optimal cut path $p_{best}$ may be empty, that is, all cut paths in the cut path set might not meet the foregoing condition: $\omega_p \leq \phi$ and $\lambda_l l_p + \lambda_\omega \omega_p \leq \lambda_l l_{best} + \lambda_\omega \omega_{best}$, indicating that an optimal target cut path could not be found, a current two-dimensional mesh model may be returned, and cutting of the two-dimensional mesh model may be stopped.

Step S104: Cut the two-dimensional mesh model based on the target cut path to obtain a model cutting result. The model cut result is used for indicating a texture unwrapping result of the two-dimensional mesh model.

In some arrangements, after the target cut path (the optimal cut path in the cut path set) is selected from the cut path set, the computer device cuts the two-dimensional mesh model based on the target cut path to obtain the final model cut result, where the model cut result is essentially still a two-dimensional mesh model.

In some arrangements, if the model cutting result includes M two-dimensional mesh sub-models, where M is a positive integer (for example, M may be 1, 2, or greater), the M two-dimensional mesh sub-models are separately unwrapped in a texture space to obtain M unwrapped two-dimensional mesh sub-models, and the M two-dimensional mesh sub-models are spliced to obtain a texture unwrapping result corresponding to the two-dimensional mesh model. If the texture unwrapping result does not meet an unwrapping effect condition, a model cutting operation may be continued on the texture unwrapping result, while if the texture unwrapping result meets the unwrapping effect condition, the texture unwrapping result may be used as a final texture unwrapping result of the two-dimensional mesh model. Based on the texture unwrapping result, UV packing may be performed, and a filling rate of the texture space may be increased. In the texture space, picture drawing may be performed on a two-dimensional mesh model obtained after UV packing processing. A drawn picture may refer to a texture map, and the texture map is mapped to a surface of a three-dimensional mesh model, so as to complete rendering processing of the three-dimensional mesh model, thereby improving a rendering effect of the three-dimensional mesh model.

In some arrangements, when cutting processing is performed on the two-dimensional mesh model, the cutting processing process may be, essentially, a recursive process. For example, a UV cutting and unwrapping tool may be run in the computer device, and an integrated recursive cutting framework may be integrated in the UV cutting and unwrapping tool. The recursive cutting framework is used for performing recursive cutting on a two-dimensional mesh model that meets a model cutting condition. By designing an appropriate interface, the recursive cutting framework may be made applicable to various cutting purposes. In other words, the foregoing mentioned types such as a ring type, a branch type, a convex hull type, and an asymmetric type are merely examples types to which aspects described herein may be applicable. By designing an interface of another type in a recursive cutting framework and based on the same execution procedure, a purpose of cutting a two-dimensional mesh model of another type can be implemented, thereby improving applicability of the recursive cutting framework.

The recursive process of the recursive cutting framework may include: ① Obtaining a cut path set A and a cut path set A' of a current UV island (for example, a two-dimensional mesh model). The cut path set A is a cut path set found based on a historical cut edge, a hard edge, and a blocked edge, and does not include a 1UV boundary. The cut path set A' is a cut path set found based on a historical cut edge, a hard edge, a blocked edge, and a 1UV boundary. If both the cut path set A and the cut path set A' are empty, the current UV island may be directly returned, and cutting may be stopped.

② When the cut path set A and the cut path set A' are not empty, an irregularity degree score $\phi$ (that is, a structural evaluation value) of the current UV island is calculated, which may be understood as a return value of a penalty function corresponding to the current UV island in a case in which the current UV island is not cut, and the cut path set A may be used as a search set first.

③ Take any cut path p from the cut path set A, calculate a path length $l_p$ of the cut path p, and calculate a penalty function value $\omega_p$ of the cut path p based on a penalty function corresponding to a model type of the current UV island (formula (1) to formula (4)).

④ If $\omega_p > \phi$ or $\lambda_l l_p + \lambda_\omega \omega_p > \lambda_l l_{best} + \lambda_\omega \omega_{best}$, discard the cut path p, delete the cut path p from the cut path set A, and return to step ③.

⑤ If $\omega_p \leq \phi$ and $\lambda_l l_p + \lambda_\omega \omega_p \leq \lambda_l l_{best} + \lambda_\omega \omega_{best}$, select a current optimal cut path $p_{best}$=P, that is, determine the cut path p as the current optimal cut path, and delete the cut path p from the cut path set A.

⑥ Repeat step ③ to step ⑤ until the cut path set A is an empty set.

⑦ If the current optimal cut path $p_{best}$ is empty, that is, the target cut path is not found, replace the cut path set A' as the search set, and re-perform step ③ to step ⑤.

⑧ If the current optimal cut path $p_{best}$ is still empty, directly return to the current UV island and stop cutting.

⑨ Cut the current UV island along the selected current optimal cut path $p_{best}$ (target cut path), perform re-unwrapping, and successively perform step ① to step ⑨ by using each re-unwrapped UV island as a new UV island (a new two-dimensional mesh model) currently processed.

⑩ Until the recursive process stops, return all current cutting results. In this case, all the returned cutting results may be referred to as model cutting results.

In some arrangements, to prevent excessive cutting in the recursive process, an excessive cutting constraint (for example, $\varepsilon$ in the foregoing formula (4)) may be added to penalty functions corresponding to different model types. When a large quantity of cut times is detected, a large value is given to $\omega_p$ to stop the recursive process, which can not only prevent excessive cutting, but also reduce a cutting operation, thereby improving cutting efficiency.

In some arrangements, to verify the validity of the recursive cutting framework described above, the use effect of the recursive cutting framework may be tested in the UV cutting and unwrapping tool. In this application, the recursive cutting framework is integrated into a cutting unwrapping tool. Therefore, a rollback mechanism may be introduced into the cutting unwrapping tool. In the following, effects of using the rollback mechanism and not using the rollback mechanism in the UV cutting and unwrapping scenario of the cutting and unwrapping tool are compared. The use effects may be indicated by a horizontal level of texture unwrapping (UV unwrapping) and a filling rate of a packing result. Example use effects are shown in the following Table 1:

TABLE 1

| Model code | Polygon quantity | Horizontal and vertical ratio with a rollback mechanism | Horizontal and vertical ratio without a rollback mechanism | Filling rate with a rollback mechanism | Filling rate without a rollback mechanism |
| --- | --- | --- | --- | --- | --- |
| 1 | 8313 | 0.95 | 0.92 | 0.79 | 0.70 |
| 2 | 1092 | 0.94 | 0.88 | 0.82 | 0.73 |
| 3 | 4495 | 0.92 | 0.87 | 0.86 | 0.75 |
| 4 | 2415 | 0.97 | 0.81 | 0.94 | 0.72 |
| 5 | 1061 | 0.99 | 0.91 | 0.68 | 0.63 |
| 6 | 4045 | 1 | 0.89 | 1 | 0.83 |

As shown in Table 1, in at least some examples, experiments are performed on six two-dimensional mesh models (UV islands). The polygon quantity refers to a quantity of polygons included in the two-dimensional mesh model. When the rollback mechanism in the cutting unwrapping tool is enabled, a horizontal and vertical ratio of texture unwrapping obtained after cutting processing of the two-dimensional mesh model and a filling rate of a packing result is improved compared to a case in which the rollback mechanism is not enabled. For example, in a case in which the cutting solution in this application is used as the rollback mechanism, a splicing effect of the two-dimensional mesh model may be improved by about 20%. Accordingly, by performing cutting processing on the two-dimensional mesh model by using the recursive cutting framework, a splicing effect of a UV two-dimensional mesh model can be improved, and a horizontal and vertical ratio of UV unwrapping and a filling rate of a packing result can be increased.

By performing cutting processing on the UV island (two-dimensional mesh model) by using the foregoing recursive cutting framework, a final cutting and unwrapping result of the two-dimensional mesh model can be obtained. Referring to FIG. 9 to FIG. 12, example cutting results of two-dimensional mesh models of different model types are illustrated.

Figure 9:
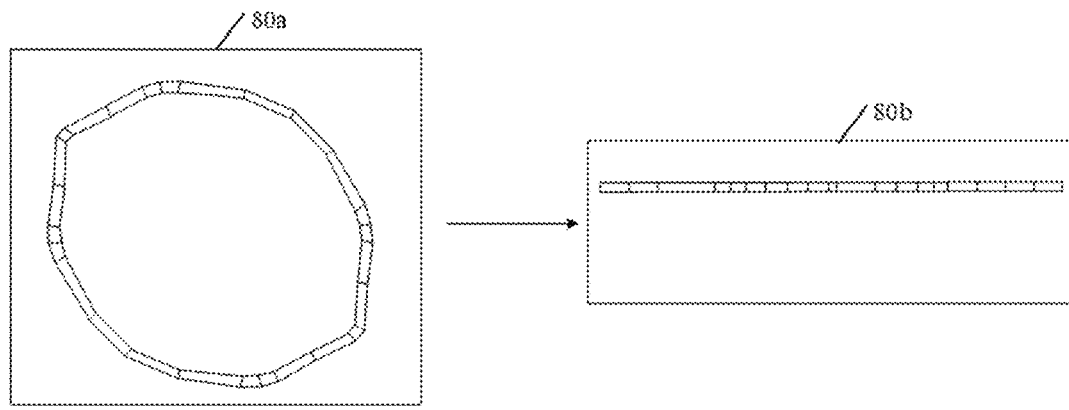
FIG. 9 is a schematic diagram of a cutting result of a two-dimensional mesh model of a ring type according to one or more aspects described herein.

FIG. 9 is a schematic diagram of an example cutting result of a two-dimensional mesh model of a ring type. As shown in FIG. 9, after a two-dimensional mesh model 80a of a ring type is cut and unwrapped, a new two-dimensional mesh model 80b may be obtained. In addition, the two-dimensional mesh model 80b does not have a hole structure, and is a regular two-dimensional mesh, so that a quantity of hole structures can be reduced, and a filling rate of a packing result can be increased.

Figure 10:
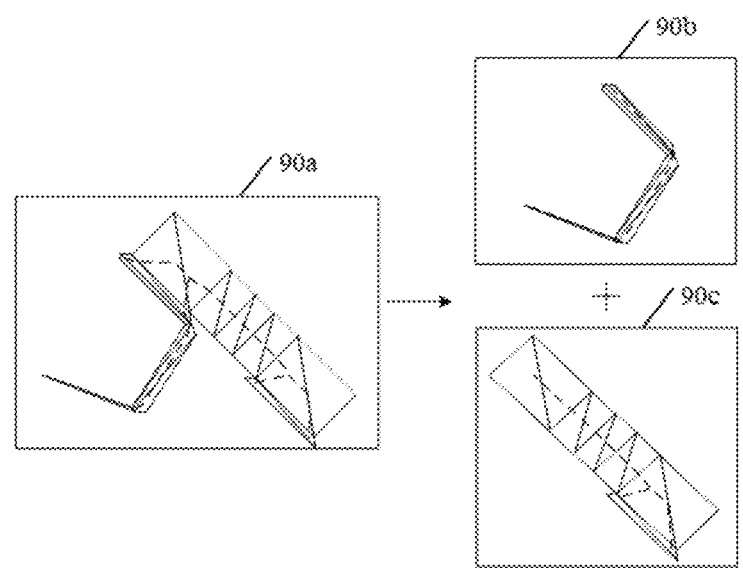
FIG. 10 is a schematic diagram of a cutting result of a two-dimensional mesh model of a branch type according to one or more aspects described herein.

FIG. 10 is a schematic diagram of an example cutting result of a two-dimensional mesh model of a branch type according to an embodiment of this application. As shown in FIG. 10, a new two-dimensional mesh model 90b and a two-dimensional mesh model 90c may be obtained after a two-dimensional mesh model 90a of a branch type is cut and unwrapped based on a quantity of branches. The two-dimensional mesh model 90b and the two-dimensional mesh model 90c reduce the quantity of branches compared with the two-dimensional mesh model 90a.

Figure 11:
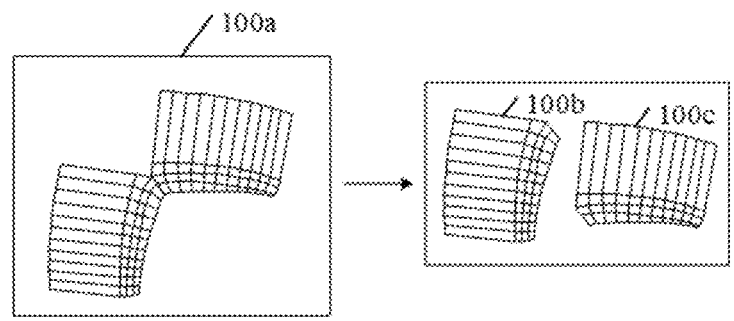
FIG. 11 is a schematic diagram of a cutting result of a two-dimensional mesh model of a convex hull type according to one or more aspects described herein.

FIG. 11 is a schematic diagram of an example cutting result of a two-dimensional mesh model of a convex hull type according to an embodiment of this application. As shown in FIG. 11, after a two-dimensional mesh model 100a of a convex hull type is cut and unwrapped, a new two-dimensional mesh model 100b and a two-dimensional mesh model 100c may be obtained. Compared with the two-dimensional mesh model 100a, the two-dimensional mesh model 100b and the two-dimensional mesh model 100c increase a ratio of an area of a two-dimensional mesh to a corresponding convex hull area corresponding thereto, thereby improving convex hull utilization, and further increasing a filling rate of a packing result.

Figure 12:
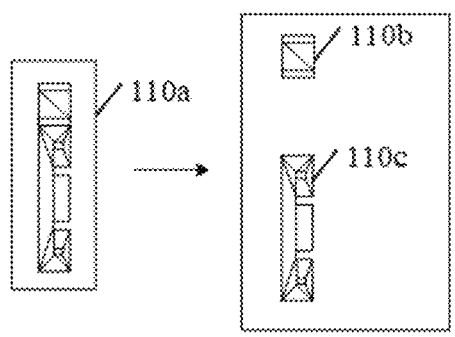
FIG. 12 is a schematic diagram of a cutting result of a two-dimensional mesh model of an asymmetric type according to one or more aspects described herein.

FIG. 12 is a schematic diagram of an example cutting result of a two-dimensional mesh model of an asymmetric type according to an embodiment of this application. As shown in FIG. 12, a new two-dimensional mesh model 110b and a two-dimensional mesh model 110c may be obtained after an asymmetric two-dimensional mesh model 110a is cut and unwrapped. The two-dimensional mesh model 110c obtained by cutting is a symmetric model, and therefore, a texture unwrapping effect can be improved based on symmetry of the two-dimensional mesh model.

In some arrangements, in addition to the foregoing description of searching for a cut path locally, and layer-by-layer processing of a two-dimensional mesh model (UV island) in a recursive manner, a penalty function may be established globally, and an optimal solution (that is, a target cut path) may be directly found globally. After the optimal solution is found, cutting and unwrapping may be performed once, thereby simplifying a cutting processing operation procedure and improving cutting and unwrapping efficiency. In some arrangements, for a two-dimensional mesh model of an asymmetric type, a symmetric feature may be detected globally on an original three-dimensional mesh model. When it is determined that a symmetric polygon set exists in a UV island, a globally optimal cutting solution may be directly searched for processing, and the cutting processing procedure may also be simplified.

In some arrangements, different penalty functions may be designed for two-dimensional mesh models of different model types, a target cut path may be determined based on a penalty function and a path length of a cut path, and then a two-dimensional mesh model may be cut by using the target cut path, so as to obtain a final model cut result, thereby improving regularity of the model cut result, and further improving a texture unwrapping effect of the two-dimensional mesh model. In addition, based on the cutting solutions described herein, the rollback mechanism may be introduced into the cutting and unwrapping tool, so as to increase a horizontal and vertical ratio of UV unwrapping and improve an effect of UV packing, thereby increasing a filling rate in a UV space and further improving a rendering effect. In addition, aesthetics of UV unwrapping can be improved.

Figure 13:
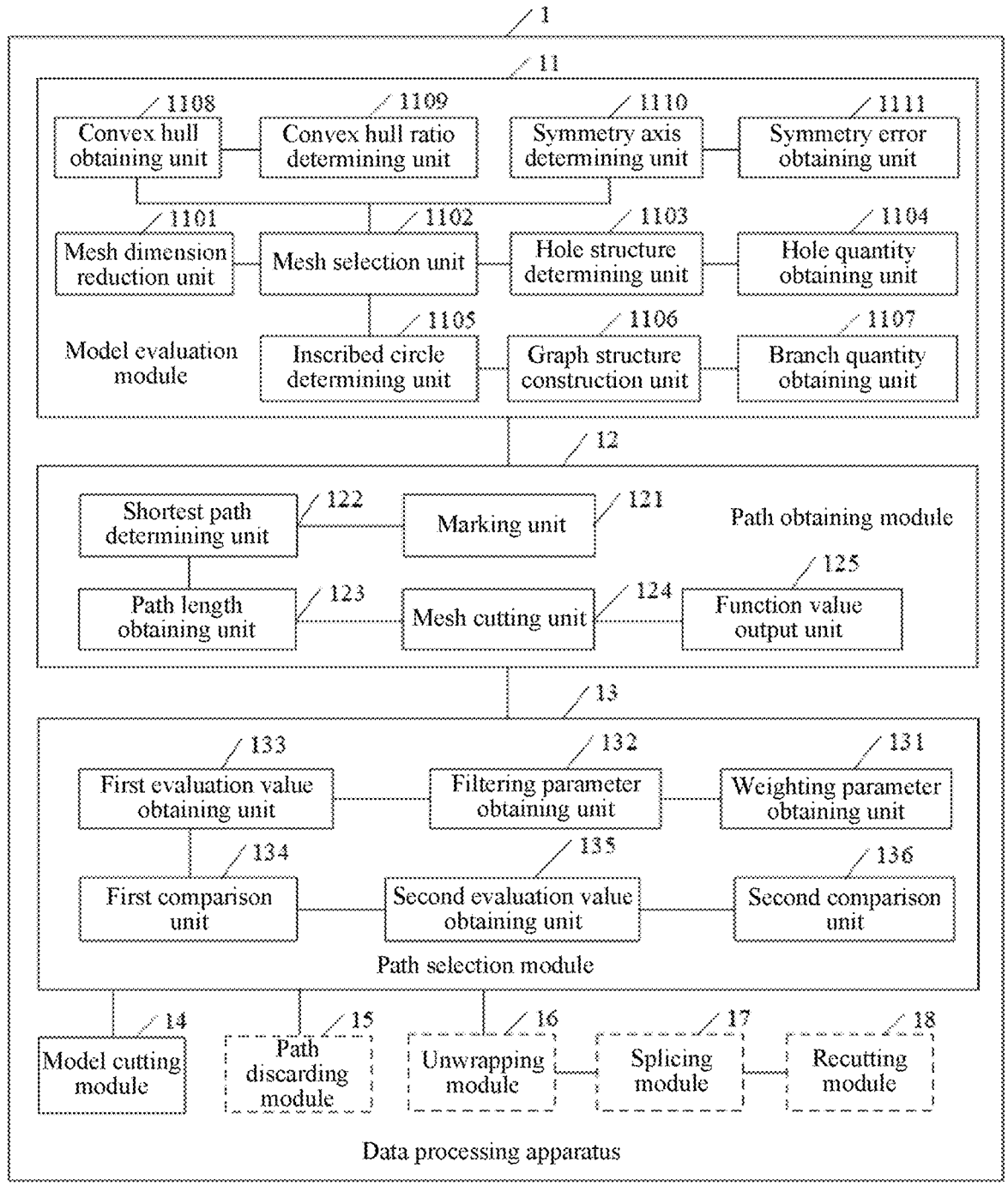
FIG. 13 is a schematic structural diagram of a data processing apparatus according to one or more aspects described herein.

FIG. 13 is a schematic structural diagram of an example data processing apparatus according to an embodiment of this application. As shown in FIG. 13, a data processing apparatus 1 may include: a model evaluation module 11, a path obtaining module 12, a path selection module 13, and a model cutting module 14.

The model evaluation module 11 is configured to: obtain a two-dimensional mesh model, and obtain a structural evaluation value of the two-dimensional mesh model according to a model type corresponding to the two-dimensional mesh model.

The path obtaining module 12 is configured to: obtain a cut path set corresponding to the two-dimensional mesh model, obtain a path length corresponding to a cut path in the cut path set, and obtain, according to the model type, a penalty function value corresponding to the cut path in the cut path set.

The path selection module 13 is configured to determine, in the cut path set, a target cut path corresponding to the two-dimensional mesh model according to the path length, the penalty function value, and the structural evaluation value.

The model cutting module 14 is configured to cut the two-dimensional mesh model based on the target cut path to obtain a model cutting result. The model cut result is used for indicating a texture unwrapping result of the two-dimensional mesh model.

For specific function implementations of the model evaluation module 11, the path obtaining module 12, the path selection module 13, and the model cutting module 14, refer to step S101 to step S104 in FIG. 3B. The description of those steps is not repeated here.

In one or more arrangements, the model evaluation module 11 includes: a mesh dimension reduction unit 1101 and a mesh selection unit 1102.

The mesh dimension reduction unit 1101 is configured to obtain a three-dimensional mesh model, divide the three-dimensional mesh model into one or more three-dimensional mesh blocks, and unwrap the one or more three-dimensional mesh blocks in a texture space to obtain one or more two-dimensional mesh models.

The mesh selection unit 1102 is configured to determine, in the one or more two-dimensional mesh models, a two-dimensional mesh model that meets a model cutting condition as a two-dimensional mesh model.

In some arrangements, the model type includes a ring type.

The model evaluation module 11 includes: a hole structure determining unit 1103 and a hole quantity obtaining unit 1104.

The hole structure determining unit 1103 is configured to determine a candidate hole structure in the two-dimensional mesh model according to the ring type corresponding to the two-dimensional mesh model.

The hole quantity obtaining unit 1104 is configured to: obtain a quantity of hole structures in the two-dimensional mesh model according to a boundary area corresponding to the candidate hole structure, and determine the quantity of hole structures as a structural evaluation value of the two-dimensional mesh model.

In some arrangements, the model type includes a branch type.

The model evaluation module includes: an inscribed circle determining unit 1105, a graph structure construction unit 1106, and a branch quantity obtaining unit 1107.

The inscribed circle determining unit 1105 is configured to determine, according to the branch type corresponding to the two-dimensional mesh model, x inscribed circles in an outer contour corresponding to the two-dimensional mesh model, to obtain a center-of-circle connection line segment between the x inscribed circles; k being a positive integer greater than 1.

The graph structure construction unit 1106 is configured to construct a graph structure corresponding to the two-dimensional mesh model by using centers of the x inscribed circles as nodes and the center-of-circle connection line segment as an edge.

The branch quantity obtaining unit 1107 is configured to: determine, according to a branch length corresponding to a branch in the graph structure, a branch quantity corresponding to the two-dimensional mesh model, and determine the branch quantity as the structural evaluation value of the two-dimensional mesh model.

In some arrangements, the model type includes a convex hull type.

The model evaluation module 11 includes: a convex hull obtaining unit 1108 and a convex hull ratio determining unit 1109.

The convex hull obtaining unit 1108 is configured to obtain, according to the convex hull type corresponding to the two-dimensional mesh model, a convex hull of an outer contour point set corresponding to the two-dimensional mesh model.

The convex hull ratio determining unit 1109 is configured to: obtain a convex hull area corresponding to the convex hull, obtain a model area corresponding to the two-dimensional mesh model, and determine a ratio of the model area to the convex hull area as the structural evaluation value of the two-dimensional mesh model.

In some arrangements, the model type includes an asymmetric type.

The model evaluation module includes: a symmetry axis determining unit 1110 and a symmetry error obtaining unit 1111.

The symmetry axis determining unit 1110 is configured to: obtain a center point of the two-dimensional mesh model according to the asymmetric type corresponding to the two-dimensional mesh model, and determine a symmetry axis of the two-dimensional mesh model by using the center point.

The symmetry error obtaining unit 1111 is configured to: determine an average error between a target point and a mapping point in the two-dimensional mesh model by using the symmetry axis, obtain, according to the average error, a symmetry error corresponding to the two-dimensional mesh model, and determine the symmetry error as the structural evaluation value of the two-dimensional mesh model.

For specific function implementations of the mesh dimension reduction unit 1101, the mesh selection unit 1102, the hole structure determining unit 1103, the hole quantity obtaining unit 1104, the inscribed circle determining unit 1105, the graph structure construction unit 1106, the branch quantity obtaining unit 1107, the convex hull obtaining unit 1108, the convex hull ratio determining unit 1109, the symmetry axis determining unit 1110, and the symmetry error obtaining unit 1111, refer to step S101 in FIG. 3B. Details are not described herein again. When the hole structure determining unit 1103 and the hole quantity obtaining unit 1104 perform a corresponding operation, the inscribed circle determining unit 1105, the graph structure construction unit 1106, the branch quantity obtaining unit 1107, the convex hull obtaining unit 1108, the convex hull ratio determining unit 1109, the symmetry axis determining unit 1110, and the symmetric error obtaining unit 1111 all suspend operations. When the inscribed circle determining unit 1105, the graph structure construction unit 1106, and the branch quantity obtaining unit 1107 perform a corresponding operation, the hole structure determining unit 1103, the hole quantity obtaining unit 1104, the convex hull obtaining unit 1108, the convex hull ratio determining unit 1109, the symmetry axis determining unit 1110, and the symmetric error obtaining unit 1111 all suspend operations. When the convex hull obtaining unit 1108 and the convex hull ratio determining unit 1109 perform a corresponding operation, the hole structure determining unit 1103, the hole quantity obtaining unit 1104, the inscribed circle determining unit 1105, the graph structure construction unit 1106, the branch quantity obtaining unit 1107, the symmetry axis determining unit 1110, and the symmetry error obtaining unit 1111 all suspend operations. When the symmetry axis determining unit 1110 and the symmetry error obtaining unit 1111 perform a corresponding operation, the hole structure determining unit 1103, the hole quantity obtaining unit 1104, the inscribed circle determining unit 1105, the graph structure construction unit 1106, the branch quantity obtaining unit 1107, the convex hull obtaining unit 1108, and the convex hull ratio determining unit 1109 all suspend operations.

In one or more embodiments, the path obtaining module 12 includes: a marking unit 121, a shortest path determining unit 122, a path length obtaining unit 123, a mesh cutting unit 124, and a function value output unit 125.

The marking unit 121 is configured to mark a historical cut edge, a hard edge, and a blocked edge in the two-dimensional mesh model, to obtain marked edges in the two-dimensional mesh model. The hard edge is used for indicating an edge whose light shadow change amounts in the two-dimensional mesh model are greater than a light shadow change threshold.

The shortest path determining unit 122 is configured to: determine a path start point and a path end point in the historical cut edge of the two-dimensional mesh model, determine a shortest cut path in the marked edges of the two-dimensional mesh model according to the path start point and the path end point, and add the shortest cut path to the cut path set.

The path length obtaining unit 123 is configured to obtain a cut path p in the cut path set, obtain a path length $l_p$ corresponding to the cut path p, and obtain a penalty function corresponding to the two-dimensional mesh model according to the model type, where p is a positive integer less than or equal to a quantity of cut paths in the cut path set.

The mesh cutting unit 124 is configured to: obtain a quantity of connections of the cut path p, and cut the two-dimensional mesh model based on the cut path p to obtain a quantity of cut communication corresponding to the cut path p.

The function value output unit 125 is configured to: if the quantity of connections of the cut path p, the quantity of cut communication corresponding to the cut path p, and the cut path p meet a constraint condition in a penalty function, output, by using the penalty function, a penalty function value $\omega_p$ corresponding to the cut path p.

For specific function implementations of the marking unit 121, the shortest path determining unit 122, the path length obtaining unit 123, the mesh cutting unit 124, and the function value output unit 125, refer to step S102 in FIG. 3B. The description of that step is not repeated here.

In one or more arrangements, the path selection module 13 includes: a weighting parameter obtaining unit 131, a filtering parameter obtaining unit 132, a first evaluation value obtaining unit 133, a first comparison unit 134, a second evaluation value obtaining unit 135, and a second comparison unit 136.

The weighting parameter obtaining unit 131 is configured to obtain a length optimization value and a penalty optimization value that correspond to the two-dimensional mesh model, and obtain a length weighting parameter associated with the length optimization value and a penalty weighting parameter associated with the penalty optimization value.

The filtering parameter obtaining unit 132 is configured to obtain a length optimization value and a penalty optimization value that are corresponding to the two-dimensional mesh model, and perform a summation operation on a product between the length weighting parameter and the length optimization value, and a product between the penalty weighting parameter and the penalty optimization value, to obtain a path filtering parameter of the two-dimensional mesh model.

The first evaluation value obtaining unit 133 is configured to perform a sum operation on a product between the length weighting parameter and a path length $l_p$, and a product between the penalty weighting parameter and a penalty function value $\omega_p$, to obtain a cut evaluation value of a cut path p.

The first comparison unit 134 is configured to: if the penalty function value $\omega_p$ is less than or equal to the structural evaluation value, and the cut evaluation value of the cut path p is less than or equal to the path filtering parameter, determine the cut path p as a current optimal cut path, and delete the cut path p from the cut path set.

The second evaluation value obtaining unit 135 is configured to: determine the cut evaluation value of the cut path p as an updated path filtering parameter, obtain a path length $l_{p+1}$ and a penalty function value $\omega_{p+1}$ that correspond to a cut path p+1 in the cut path set, and perform a sum calculation on a product between the length weighting parameter and the path length $l_{p+1}$, and a product between the penalty weighting parameter and the penalty function value $\omega_{p+1}$, to obtain a cut evaluation value of the cut path p+1.

The second comparison unit 136 is configured to: if the penalty function value $\omega_{p+1}$ is less than or equal to the structural evaluation value, and the cut evaluation value of the cut path p+1 is less than or equal to the updated path filtering parameter, determine the cut path p+1 as an updated current optimal cut path, delete the cut path p+1 from the cut path set until the cut path set is an empty set, and determine the updated current optimal cut path as a target cut path.

For specific function implementations of the weighting parameter obtaining unit 131, the filtering parameter obtaining unit 132, the first evaluation value obtaining unit 133, the first comparison unit 134, the second evaluation value obtaining unit 135, and the second comparison unit 136, refer to step S103 in FIG. 3B. The description of that step is not repeated here.

In one or more arrangements, the data processing apparatus 1 further includes: a path discarding module 15.

The path discarding module 15 is configured to: if the penalty function value $\omega_p$ is greater than the structural evaluation value, or the cut evaluation value of the cut path p is greater than the path filtering parameter, delete the cut path p from the cut path set, and continue to keep the path filtering parameter unchanged.

In some arrangements, the model cutting result includes M two-dimensional mesh sub-models, and M is a positive integer.

The data processing apparatus 1 further includes: a unwrapping module 16, a splicing module 17, and a recutting module 18.

The unwrapping module 16 is configured to separately unwrap the M two-dimensional mesh sub-models in a texture space to obtain unwrapped M two-dimensional mesh sub-models.

The splicing module 17 is configured to splice the M two-dimensional mesh sub-models to obtain a texture unwrapping result corresponding to the two-dimensional mesh model.

The recutting module 18 is configured to: if the texture unwrapping result does not meet an unwrapping effect condition, continue to perform a model cutting operation on the texture unwrapping result.

For specific function implementations of the path discarding module 15, the unwrapping module 16, the splicing module 17, and the recutting module 18, refer to step S104 in FIG. 3B. The description of that step is not repeated here.

According to various aspects, different penalty functions may be designed for two-dimensional mesh models of different model types, a target cut path may be determined based on a penalty function and a path length of a cut path, and then a two-dimensional mesh model may be cut by using the target cut path, so as to obtain a final model cut result, thereby improving regularity of the model cut result, and further improving a texture unwrapping effect of the two-dimensional mesh model. In addition, based on the cutting solutions described herein, the rollback mechanism may be introduced into the cutting and unwrapping tool, so as to increase a horizontal and vertical ratio of UV unwrapping and improve an effect of UV packing, thereby increasing a filling rate in a UV space and further improving a rendering effect. In addition, aesthetics of UV unwrapping can be improved.

Figure 14:
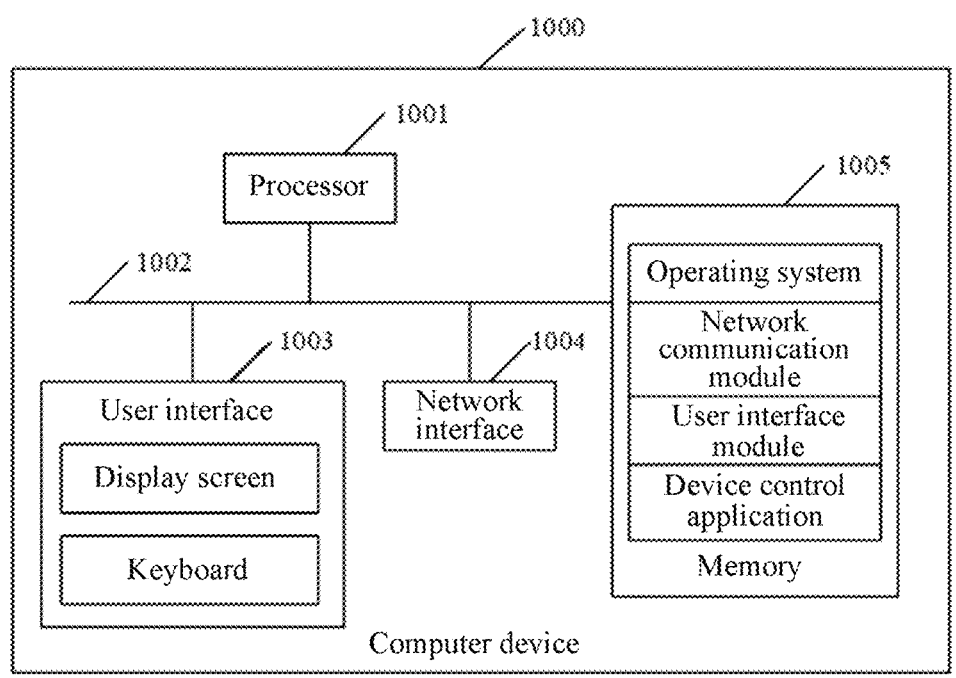
FIG. 14 is a schematic structural diagram of a computer device according to one or more aspects described herein.

FIG. 14 is a schematic structural diagram of a computer device according to one or more aspects. As shown in FIG. 14, the computer device 1000 may be a user terminal, for example, the user terminal 10a of FIG. 1, or may be a server, for example, the server 10d of FIG. 1, which is not limited herein. For ease of understanding, the computer device being a user terminal is used as an example, and the computer device 1000 may include: a processor 1001, a network interface 1004, and a memory 1005. In addition, the foregoing computer device 1000 may further include: a user interface 1003 and at least one communication bus 1002. The communication bus 1002 is configured to implement connection and communication between these components. The user interface 1003 may further include a standard wired interface and wireless interface. The network interface 1004 may optionally include a standard wired interface and wireless interface (for example, a Wi-Fi interface). The memory 1005 may be a high-speed RAM memory, or may be a non-volatile memory, for example, at least one magnetic disk memory. Optionally, the memory 1005 may be at least one storage apparatus that is located far away from the foregoing processor 1001. As shown in FIG. 14, the memory 1005 used as a computer readable storage medium may include an operating system, a network communication module, a user interface module, and a device-control application program.

The network interface 1004 in the computer device 1000 may further provide a network communication function, and optionally the user interface 1003 may further include a display and a keyboard. In the computer device 1000 shown in FIG. 14, the network interface 1004 may provide a network communication function. The user interface 1003 is mainly configured to provide an input interface for a user. The processor 1001 may be configured to invoke the device-control application program stored in the memory 1005 to implement:

obtaining a two-dimensional mesh model, and obtaining a structural evaluation value of the two-dimensional mesh model according to a model type corresponding to the two-dimensional mesh model;

obtaining a cut path set corresponding to the two-dimensional mesh model, obtaining a path length corresponding to a cut path in the cut path set, and obtaining, according to the model type, a penalty function value corresponding to the cut path in the cut path set;

determining, in the cut path set, a target cut path corresponding to the two-dimensional mesh model according to the path length, the penalty function value, and the structural evaluation value; and cutting the two-dimensional mesh model based on the target cut path to obtain a model cutting result. The model cut result is used for indicating a texture unwrapping result of the two-dimensional mesh model.

It is to be understood that the computer device 1000 may perform the data processing method of FIG. 3B, or may perform functions of the data processing apparatus 1 of FIG. 7. Details are not described herein again. In addition, the description of beneficial effects of the same method are not described herein again.

In addition, a computer readable storage medium may be provided. The computer readable storage medium may store a computer program executed by the foregoing data processing apparatus 1, and the computer program includes program instructions. When the processor executes the program instructions, a data processing method of FIG. 3B can be executed. Therefore, details are not described herein again. In addition, the description of beneficial effects of the same method are not described herein again. Technical details of the computer readable storage medium are provided with respect to the methods described herein. As an example, the program instructions may be deployed on one computing device, or executed on multiple computing devices located at one location, or executed on multiple computing devices distributed at multiple locations and interconnected by using a communication network, and a blockchain system can be formed by multiple computing devices distributed at multiple locations and interconnected by using a communication network.

In addition, a computer program product or a computer program may also be provided. The computer program product or the computer program may include computer instructions, and the computer instructions may be stored in a computer readable storage medium. A processor of a computer device reads the computer instructions from the computer readable storage medium, and the processor may execute the computer instructions, so that the computer device executes the data processing method of FIG. 3B. Therefore, details are not described herein again. In addition, the description of beneficial effects of the same method are not described herein again. Technical details related to the computer program product or the computer program are provided with respect to the methods described herein.

To simplify the description, the methods are described as a combined series of actions. But persons of ordinary skill in the art would recognize that such description is not limited to any particular sequence of actions, as some steps can adopt other sequences or can be executed simultaneously. In addition, a person skilled in the art also would also recognize that that described method steps and system elements are only examples, and that the mentioned actions and modules are not necessarily mandatory.

The steps of the methods described herein may be adjusted in terms of sequence, and merged or deleted according to an actual requirement.

The modules in the apparatuses described herein may be combined, divided, or deleted according to an actual requirement.

Technical features described herein may be randomly combined. To make description concise, not all possible combinations of the technical features are described. However, the combinations of these technical features shall be considered as falling within the scope of the invention provided that no conflict exists.

A person of ordinary skill in the art would also recognize that all or a part of the processes of the methods described herein may be implemented by a program instructing relevant hardware. The program may be stored in a computer readable storage medium. When the program is run, the processes of the method in the foregoing embodiment are performed. The foregoing storage medium may include a magnetic disc, an optical disc, a read-only memory (ROM), a random access memory (RAM), or the like.

What is disclosed herein are merely examples, and not intended to limit the scope of the claims. Therefore, equivalent variations made in accordance with the claims shall fall within the scope of the invention.

What is claimed is:

1. A data processing method, performed by an electronic device, comprising:
    obtaining a set of edges, marked as usable for cutting, from a two-dimensional mesh model, the two-dimensional mesh model being a connected two-dimensional mesh in at least one two-dimensional mesh obtained by performing two-dimensional unwrapping on a virtual three-dimensional model;
    searching the set of edges to obtain a cut path set, the cut path set comprising at least two candidate cut paths, each of the at least two candidate cut paths comprising at least one edge of the set of edges, and the at least one edge cutting the two-dimensional mesh model into at least two separated two-dimensional mesh models;
    for each candidate cut path in the cut path set:
        calculating a path length of the candidate cut path,
        calculating a structural evaluation value corresponding to the candidate cut path, the structural evaluation value representing regularity degrees of shapes of at least two sub-models obtained by cutting the two-dimensional mesh model by using the candidate cut path, and
        calculating a cut evaluation value of the candidate cut path based on the path length and the structural evaluation value,
    selecting one candidate cut path from the at least two candidate cut paths as a target cut path based on the cut evaluation values of the at least two candidate cut paths; and
    cutting the two-dimensional mesh model into at least two sub-models by using the target cut path, the at least two sub-models being used for generating a texture unwrapping result of the two-dimensional mesh model.

2. The method according to claim 1, further comprising:
    obtaining a three-dimensional mesh model corresponding to the virtual three-dimensional model;
    dividing the three-dimensional mesh model into one or more three-dimensional mesh blocks; and
    unwrapping the one or more three-dimensional mesh blocks in a texture space to obtain the two-dimensional mesh model.

3. The method according to claim 1, wherein the calculating the structural evaluation value corresponding to the candidate cut path comprises:
    determining a preset structure in each of the at least two sub-models;
    calculating a value of a preset feature of the preset structure in each sub-model; and
    determining a sum of values of preset features corresponding to the at least two sub-models as the structural evaluation value.

4. The method according to claim 3, wherein the preset structure is a candidate hole structure, and calculating the value of the preset feature of the preset structure in each sub-model comprises:
    obtaining, according to a boundary area corresponding to the candidate hole structure, a quantity of hole structures in the at least two sub-models as the value of the preset feature.

5. The method according to claim 3, wherein the preset structure is at least two inscribed circles in an outer contour of each sub-model, and calculating the value of the preset feature of the preset structure in each sub-model comprises:
    obtaining a center-of-circle connection line segment between the at least two inscribed circles;
    constructing a graph structure corresponding to the sub-model by using centers of the at least two inscribed circles as nodes and using the center-of-circle connection line segment as an edge; and
    determining, based on a branch length corresponding to a branch in the graph structure, a quantity of branches corresponding to the sub-model as the value of the preset feature.

6. The method according to claim 3, wherein the preset structure is a convex hull of an outer contour point set corresponding to each sub-model, and calculating the value of the preset feature of the preset structure in each sub-model comprises:
    obtaining a convex hull area corresponding to the convex hull,
    obtaining a model area corresponding to the sub-model, and
    using a ratio of the model area to the convex hull area as the value of the preset feature.

7. The method according to claim 3, wherein the preset structure is a center point of each sub-model, and the calculating the value of the preset feature of the preset structure in each sub-model comprises:
    determining a symmetry axis of the sub-model by using the center point;
    determining an average error between a target point and a mapping point in the sub-model by using the symmetry axis; and
    obtaining, according to the average error, a symmetry error corresponding to the sub-model as the value of the preset feature.

8. The method according to claim 1, wherein the edges marked as usable for cutting comprise: a historical cut edge, a hard edge, and a blocked edge in the two-dimensional mesh model, the hard edge being used for indicating an edge whose light shadow change amount between opposite sides of the edge in the two-dimensional mesh model is greater than a light shadow change threshold; and
wherein searching the set of edges to obtain the cut path set comprises:
determining a path start point and a path end point in the historical cut edge of the two-dimensional mesh model, determining a shortest cut path in the marked edges of the two-dimensional mesh model according to the path start point and the path end point, and
adding the shortest cut path to the cut path set.

9. The method according to claim 1, wherein calculating the cut evaluation value of each candidate cut path comprises:
calculating a weighted sum of the path length and the structural evaluation value as the cut evaluation value.

10. The method according to claim 9, wherein calculating the cut evaluation value of each candidate cut path comprises:
obtaining a total quantity of edges in the candidate cut path;
obtaining a total quantity of sub-models obtained by cutting the two-dimensional mesh model by using the candidate cut path; and
calculating the cut evaluation value of the candidate cut path in response to that the total quantity of edges and the total quantity of sub-models meet a preset constraint condition.

11. The method according to claim 9, wherein calculating the cut evaluation value of each candidate cut path comprises:
calculating a structural evaluation value of the two-dimensional mesh model;
calculating the cut evaluation value of the candidate cut path in response to determining that the structural evaluation value of the candidate cut path is less than the structural evaluation value of the two-dimensional mesh model; and
deleting the candidate cut path from the cut path set in response to determining that the structural evaluation value of the candidate cut path is not less than the structural evaluation value of the two-dimensional mesh model.

12. The method according to claim 1, wherein selecting the one candidate cut path from the at least two candidate cut paths as the target cut path based on the cut evaluation value comprises:
selecting, from the at least two candidate cut paths, a candidate cut path corresponding to an largest value of the cut evaluation value as the target cut path.

13. The method according to claim 1, further comprising:
separately unwrapping the at least two sub-models in a texture space to obtain at least two unwrapped sub-models;
splicing the at least two unwrapped two-dimensional mesh sub-models to obtain a texture unwrapping result corresponding to the two-dimensional mesh model; and
using, in a case that the texture unwrapping result does not meet an unwrapping effect condition, at least one of the at least two sub-models as a subsequent two-dimensional mesh model and determining the target cut path of the subsequent two-dimensional mesh model.

14. A data processing apparatus, comprising:
a processor; and
memory operatively coupled to the processor, the memory storing computer readable instructions that, when executed by the processor, causes the apparatus to provide:
a path obtaining module configured to:
obtain a set of edges, marked as usable for cutting, from a two-dimensional mesh model, the two-dimensional mesh model being a connected two-dimensional mesh in at least one two-dimensional mesh obtained by performing two-dimensional unwrapping on a virtual three-dimensional model; and
search the set of edges to obtain a cut path set, the cut path set comprising at least two candidate cut paths, each candidate cut path comprising at least one edge of the set of edges, and the at least one edge cutting the two-dimensional mesh model into at least two separated two-dimensional mesh models;
a path selection module configured to:
calculate, for each candidate cut path in the cut path set, a path length of the candidate cut path; and
calculate a structural evaluation value corresponding to the candidate cut path, the structural evaluation value representing regularity degrees of shapes of at least two sub-models obtained by cutting the two-dimensional mesh model by using the candidate cut path;
calculate a cut evaluation estimate of each candidate cut path based on the path length and the structural evaluation value; and
select one candidate cut path from the at least two candidate cut paths as a target cut path according to the cut evaluation value; and
a model cutting module configured to cut the two-dimensional mesh model into at least two sub-models by using the target cut path, the at least two sub-models being used for generating a texture unwrapping result of the two-dimensional mesh model.

15. The data processing apparatus of claim 14, wherein the path obtaining module is further configured to:
obtain a three-dimensional mesh model corresponding to the virtual three-dimensional model;
divide the three-dimensional mesh model into one or more three-dimensional mesh blocks; and
unwrap the one or more three-dimensional mesh blocks in a texture space to obtain the two-dimensional mesh model.

16. The data processing apparatus of claim 14, wherein calculating the structural evaluation value corresponding to the candidate cut path comprises:
determining a preset structure in each of the at least two sub-models;
calculating a value of a preset feature of the preset structure in each sub-model; and
determining a sum of values of preset features corresponding to the at least two sub-models as the structural evaluation value.

17. The data processing apparatus of claim 14, wherein the edges marked as usable for cutting comprise: a historical cut edge, a hard edge, and a blocked edge in the two-dimensional mesh model, the hard edge being used for indicating an edge whose light shadow change amount between opposite sides of the edge in the two-dimensional mesh model is greater than a light shadow change threshold; and wherein searching the set of edges to obtain the cut path set comprises:

determining a path start point and a path end point in the historical cut edge of the two-dimensional mesh model, determining a shortest cut path in the marked edges of the two-dimensional mesh model according to the path start point and the path end point, and adding the shortest cut path to the cut path set.

18. A non-transitory computer-readable storage medium, the non-transitory computer-readable storage medium storing a computer program, and the computer program being loaded and executed by a processor, so that a computer device having the processor is caused to:

obtain a set of edges, marked as usable for cutting, from a two-dimensional mesh model, the two-dimensional mesh model being a connected two-dimensional mesh in at least one two-dimensional mesh obtained by performing two-dimensional unwrapping on a virtual three-dimensional model;

search the set of edges to obtain a cut path set, the cut path set comprising at least two candidate cut paths, each of the at least two candidate cut paths comprising at least one edge of the set of edges, and the at least one edge cutting the two-dimensional mesh model into at least two separated two-dimensional mesh models;

for each candidate cut path in the cut path set:
calculate a path length of the candidate cut path,
calculate a structural evaluation value corresponding to the candidate cut path, the structural evaluation value representing regularity degrees of shapes of at least two sub-models obtained by cutting the two-dimensional mesh model by using the candidate cut path, and calculate a cut evaluation estimate of the candidate cut path based on the path length and the structural evaluation value;

select one candidate cut path from the at least two candidate cut paths as a target cut path based on the cut evaluation values of the at least two candidate cut paths; and cut the two-dimensional mesh model into at least two sub-models by using the target cut path, the at least two sub-models being used for generating a texture unwrapping result of the two-dimensional mesh model.

19. The non-transitory computer-readable storage medium of claim 18, wherein the computer device having the processor is further caused to:

obtain a three-dimensional mesh model corresponding to the virtual three-dimensional model;

divide the three-dimensional mesh model into one or more three-dimensional mesh blocks; and unwrap the one or more three-dimensional mesh blocks in a texture space to obtain the two-dimensional mesh model.

20. The non-transitory computer-readable storage medium of claim 18, wherein calculating the structural evaluation value corresponding to the candidate cut path comprises:

determining a preset structure in each of the at least two sub-models;

calculating a value of a preset feature of the preset structure in each sub-model; and determining a sum of values of preset features corresponding to the at least two sub-models as the structural evaluation value.

* * * * *